US 6,729,988 B2

(12) United States Patent
Katou et al.

(10) Patent No.: US 6,729,988 B2
(45) Date of Patent: May 4, 2004

(54) HYDRAULIC SYSTEM FOR AUTOMATIC TRANSMISSION FOR VEHICLE HAVING IDLE-STOP CONTROL

(75) Inventors: Yoshiaki Katou, Kanagawa (JP); Isamu Ohtake, Shizuoka (JP); Takeshi Miyagi, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/157,873

(22) Filed: May 31, 2002

(65) Prior Publication Data

US 2002/0183164 A1 Dec. 5, 2002

(30) Foreign Application Priority Data

| Jun. 4, 2001 | (JP) | 2001-167905 |
| Nov. 7, 2001 | (JP) | 2001-341349 |
| Jan. 30, 2002 | (JP) | 2002-020990 |
| May 16, 2002 | (JP) | 2002-142167 |

(51) Int. Cl.[7] ............................. F16H 3/00; F16H 61/62
(52) U.S. Cl. ...................................... 475/128; 477/127
(58) Field of Search ........................... 475/127, 128, 475/130; 477/127, 130, 131

(56) References Cited

U.S. PATENT DOCUMENTS

| 4,941,370 A | * | 7/1990 | Ishii | 475/128 |
| 2003/0144111 A1 | * | 7/2003 | Kato | 477/92 |

FOREIGN PATENT DOCUMENTS

| DE | 3120257 A1 | * | 1/1983 | 475/128 |
| JP | 04300459 A | * | 10/1992 | 477/127 |
| JP | 2000-46166 | | 2/2000 | |
| JP | 2001263467 A | * | 9/2001 | |

* cited by examiner

Primary Examiner—Roger Pang
(74) Attorney, Agent, or Firm—Foley & Lardner LLP

(57) ABSTRACT

A hydraulic system for an automatic transmission for a vehicle with an engine having idle-stop control includes a bypass passage which allows communication between a first hydraulic passage downstream of a manual valve and a forward engagement element, a first switching valve arranged on the bypass passage to be switched between a communicating state and a non-communicating state, and a first switching device which switches the first switching valve between the communicating state and the non-communicating state. The first switching device switches the first switching valve to the communicating state when the hydraulic pressure is lower than a predetermined pressure.

19 Claims, 21 Drawing Sheets

FIG.3

| RANGE | | SHIFT VALVE A | SHIFT VALVE B | H/C | L/C | R/C | L&R/B | B/B SERVO APPLY | B/B SERVO RELEASE |
|---|---|---|---|---|---|---|---|---|---|
| P | | OFF | OFF | × | × | × | × | × | × |
| R | | OFF | OFF | × | × | ○ | ○ | × | × |
| N | | OFF | OFF | × | × | × | × | × | × |
| D | 1 | ON | ON | × | ○ | × | × | × | × |
| D | 2 | OFF | ON | ○ | ○ | × | × | ○ | × |
| D | 3 | OFF | OFF | ○ | × | × | × | ○ | ○ |
| D | 4 | ON | ON | × | ○ | × | × | ○ | × |
| 2 | 2 | OFF | ON | × | ○ | × | × | ○ | × |
| 2 | 1 | ON | ON | × | ○ | × | × | × | × |
| 1 | 1 | ON | ON | × | ○ | × | ○ | × | × |

○ : ENGAGEMENT  
× : DISENGAGEMENT

F : FILTER

F : FILTER

F : FILTER

PL DUTY SOLENOID
OUTPUT PRESSURE

PUMP DISCHARGE PRESSURE
IMMEDIATELY AFTER RESTART
(kg/cm²)

HYDRAULIC SYSTEM FOR AUTOMATIC TRANSMISSION FOR VEHICLE HAVING IDLE-STOP CONTROL

BACKGROUND OF THE INVENTION

The present invention relates to a hydraulic system for an automatic transmission, and more particularly, to a hydraulic system for an automatic transmission for a vehicle having idle-stop control for stopping engine idle at a standstill of the running vehicle.

In recent years, idle-stop vehicles are already operational wherein when the running vehicle comes into a standstill, and predetermined stop conditions are formed, an engine is automatically stopped to achieve fuel savings, a reduction in exhaust emission or noises and the like. With such vehicle, when the engine is stopped, a main pump driven by the engine is stopped, so that oil supplied to a forward engagement element of an automatic transmission is drawn from a hydraulic passage, lowering the hydraulic pressure. As a result, when the engine is restarted, the forward engagement element to be engaged at forward running releases from its engagement state. Thus, if the forward engagement element is not engaged quickly at engine restart, an accelerator pedal is depressed in the neutral state as it were, which may produce an engagement shock by engagement of the forward engagement element with the engine at full throttle.

The technique for solving the above inconvenience is proposed in JP-A 2000-46166. This technique uses two pumps wherein the main pump is operated to supply hydraulic fluid, and the assist pump driven by an electric motor is operated solely at stop of the main pump such as at engine stop to compensate for flow shortage, allowing secured supply of hydraulic fluid to the automatic transmission while keeping power consumption of a battery at the minimum.

SUMMARY OF THE INVENTION

However, in the above earlier art, the assist pump driven by the electric motor is always driven at engine stop, leading to significant power consumption. At traffic congestion or the like, particularly, there arises a problem that a great load is applied not only to the battery, but also to the motor itself for driving the assist pump. Moreover, since the assist pump is driven by the electric motor, the assist pump and the electric motor should be mounted on the automatic transmission, raising a problem of deteriorating the vehicle mountability.

It is, therefore, an object of the present invention to provide a hydraulic system for an automatic transmission for a vehicle having idle-stop control, which allows smooth running of the vehicle during execution of idle-stop control.

The present invention provides generally a hydraulic system for a vehicle with: an engine having idle-stop control, the idle-stop control controlling idle-start and idle-stop of the engine in accordance with preset idle-stop conditions; and an automatic transmission which carries out speed change using a hydraulic pressure supplied from a hydraulic-pressure source, the automatic transmission comprising a forward engagement element, wherein the hydraulic system comprises: a control valve unit which controls the speed change of the automatic transmission, the control valve unit including a manual valve; a bypass passage which allows communication between a first hydraulic passage downstream of the manual valve and the forward engagement element; a first switching valve arranged on the bypass passage, the first switching valve being switched between a communicating state and a non-communicating state; and a first switching device which switches the first switching valve between the communicating state and the non-communicating state, the first switching device switching the first switching valve to the communicating state when the hydraulic pressure is lower than a predetermined pressure.

BRIEF DESCRIPTION OF THE DRAWINGS

The other objects and features of the present invention will become apparent from the following description with reference to the accompanying drawings, wherein:

FIG. 3 is a table showing engagement of engagement elements in the multiple-speed transmission;

DETAILED DESCRIPTION OF THE INVENTION

Figure 1:
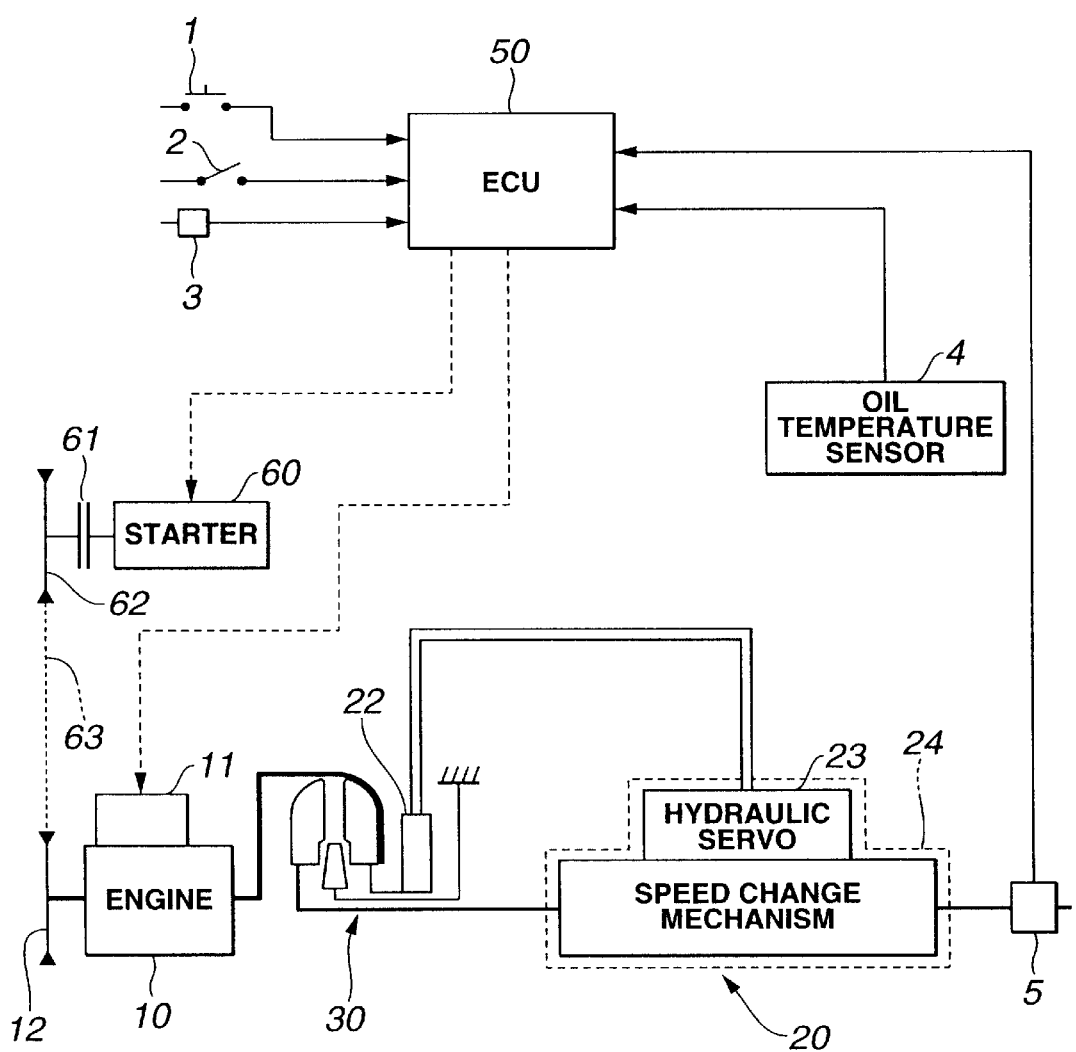
FIG. 1 is a block diagram showing a control system for a vehicle provided with a hydraulic system for an automatic transmission embodying the present invention.

Referring to the drawings, a description is made with regard to a hydraulic system for an automatic transmission for a vehicle having idle-stop control embodying the present invention.

Referring to FIG. 1, a vehicle comprises an engine 10, an automatic transmission 20, a torque converter 30, an electronic control unit (ECU) 50, and a starter generator 60.

The engine 10 is provided with a fuel supply system 11 for supplying fuel to the engine 10, and a chain sprocket 12 connected by a chain 63 to a chain sprocket 62 which is provided to the starter generator 60 through an electromagnetic clutch 61. When serving as a starter of the engine 10, a generator in deceleration, and a generator for generating power in accordance with the battery storage state, the starter generator 60 is put in engagement with the engine 10 by the electromagnetic clutch 61.

The automatic transmission 20 is provided with a main pump 22 rotated with the engine 10 and for supplying the hydraulic pressure to a hydraulic servo 23.

The ECU 50 inputs signals from an idle-stop switch 1, a brake switch 2, a steering angle sensor 3, an oil temperature sensor 4, and a vehicle speed sensor 5 so as to control operation of the starter generator 60 and the fuel supply system 11.

Figure 2:
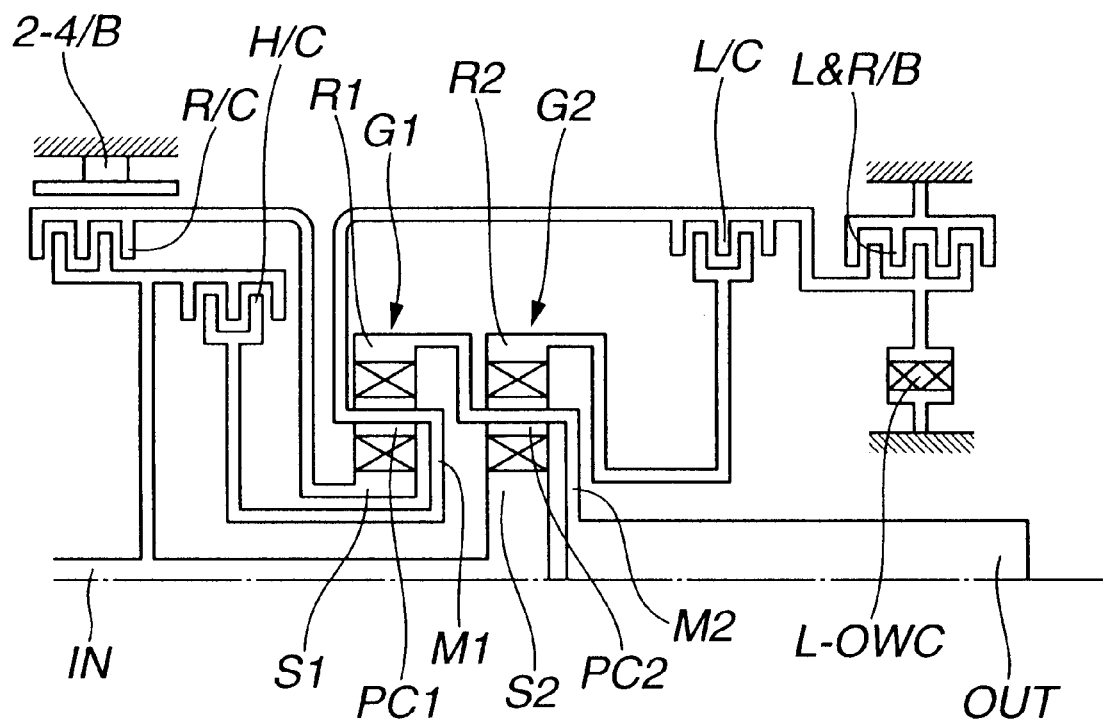
FIG. 2 is a schematic drawing illustrating a multiple-speed transmission or a speed change mechanism.

In the first embodiment, a speed change mechanism 24 comprises a gear-type multiple-speed transmission. Referring to FIG. 2, the multiple-speed transmission includes planetary gears G1, G2, coupling members M1, M2, clutches R/C, H/C, L/C, brakes BIB, L&R/B, a one-way clutch L-OWC, an input shaft or member IN, and an output shaft or member OUT.

The first planetary gear G1 is a single pinion type planetary gear comprising a first sun gear S1, a first ring gear R1, and a first carrier PC1 for supporting a pinion meshed with the gears S1, R1. The second planetary gear G2 is a single pinion type planetary gear comprising a second sun gear S2, a second ring gear R2, and a second carrier PC2 for supporting a pinion meshed with the gears S2, R2. The third planetary gear G3 is a single pinion type planetary gear comprising a third sun gear S3, a third ring gear R3, and a third carrier PC3 for supporting a pinion meshed with the gears S3, R3.

The first coupling member M1 is a member for integrally coupling the first carrier PC1 to the second ring gear R2 through a low clutch L/C. The second coupling member M2 is a member for integrally coupling the first ring gear R1 to the second carrier PC2.

The reverse clutch R/C is engaged at the reverse (R) range to connect the input shaft IN and the first sun gear S1. The high clutch H/C is engaged at the third and fourth speeds to connect the input shaft IN and the first carrier PC1. The low clutch L/C is engaged at the first, second, and third speeds to connect the first carrier PC1 and the second ring gear R2.

The low and reverse brake L&R/B is engaged at the first speed and the R range to fix rotation of the first carrier PC1. The band brake B/B is engaged at the second and fourth speeds to fix rotation of the first sun gear S1. The low one-way clutch L-OWC is actuated when the vehicle is in acceleration at the first speed to fix rotation of the first carrier PC1, and it is not actuated during deceleration.

The input shaft IN is coupled to the first ring gear R1 so as to input engine torque through the torque converter 30. The output shaft OUT is coupled to the second carrier PC3 so as to transfer its output torque to driving wheels through a final gear and the like, not shown. Connected to the clutches and the brakes is the hydraulic servo 23 for creating the engagement pressure and the release pressure at each gear ratio.

Next, speed change operation is described. FIG. 3 shows a table of engagement operation in the speed change mechanism 24 in the first embodiment. In FIG. 3, a sign ○ denotes the engagement state, and a sign X denotes the disengagement state.

Figure 4:
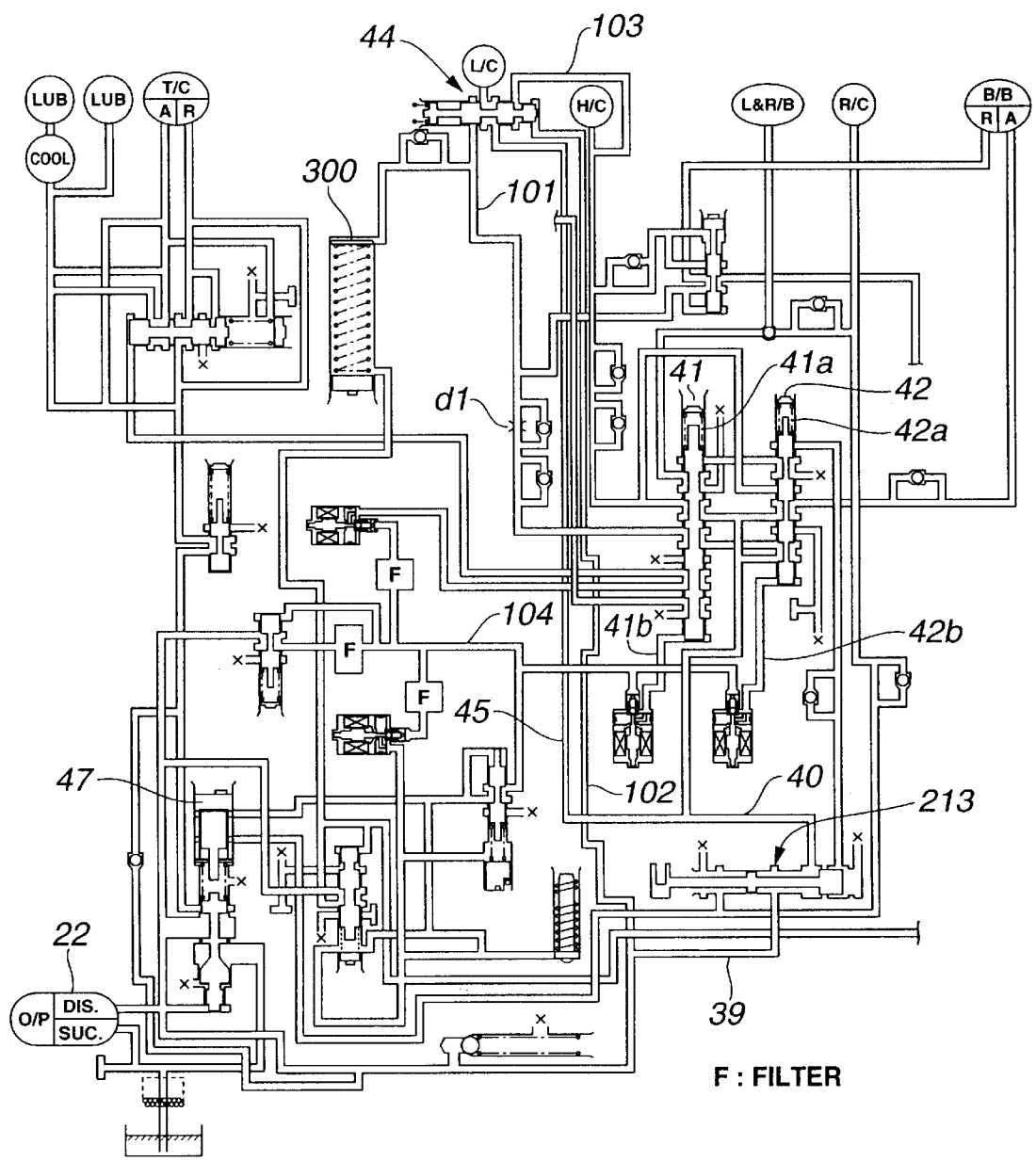
FIG. 4 is a diagram illustrating a hydraulic circuit in a first embodiment.

Referring to FIG. 4, there is shown a hydraulic circuit for supplying the control pressure from the hydraulic servo 23 to the speed change mechanism 24 in the first embodiment. The hydraulic circuit comprises a pump 22 driven by the engine 10, a pressure regulating valve 47 for regulating the discharge pressure of the pump 22 for the line pressure, a line-pressure passage 39 for supplying the line pressure to a manual valve 213, and another line-pressure passage or first hydraulic passage 40 for supplying the line pressure downstream of the manual valve 213.

The hydraulic circuit also comprises a first shift valve 41 and second shift valve 42 for switching circuit sections, and pilot-pressure passages 41b, 42b for supplying the pilot pressure for operating the shift valves 41, 42. The second line-pressure passage 40 is provided with a bypass passage 45 with less passage resistance, which is arranged immediately upstream of the low clutch L/C. A first switching valve 44 is arranged on the bypass passage 45 to switch between the communicating state and the non-communicating state for the bypass passage 45 and the low clutch L/C.

Figure 5:
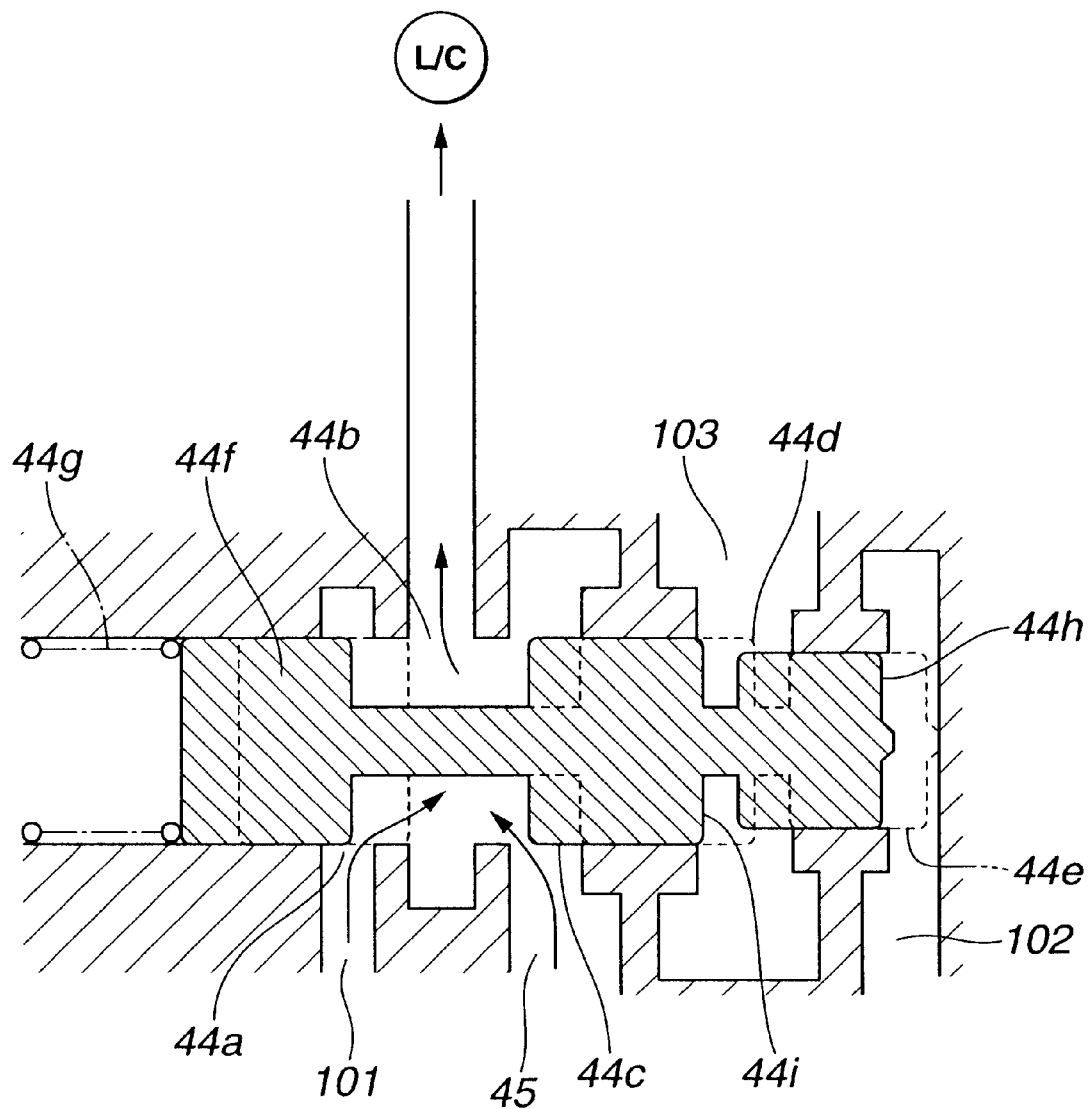
FIG. 5 is a sectional view showing a first switching valve in FIG. 4.

Referring to FIG. 5, the first switching valve 45 comprises a spool valve 44f and a return spring 44g. The spool valve 44f includes a first pressure acting portion 44h and a second pressure acting portion 44i on which the hydraulic pressure opposite to a reaction force of the return spring 44g acts. A port 44a communicates with a normal low-clutch pressure passage or second hydraulic passage 101 provided with an orifice d1 and a low-clutch accumulator chamber 300. A port 44b communicates with the low clutch L/C. A port 44c communicates with the bypass passage 45. A port 44d communicates with an interlock preventing passage 103 for supplying the engagement pressure of the high clutch H/C. And a port 44e communicates with a switching line-pressure passage or third hydraulic passage 102 before passage of the manual valve 213.

It is desirable to minimize the passage resistance of the bypass passage 45. Specifically, the other hydraulic passages, particularly, at points immediately upstream of the engagement elements, are provided with orifices for preventing the surge pressure immediately after engagement, adjusting the build-up characteristics of the line pressure. Thus, by setting the passage resistance of the bypass passage 45 at a lower value, most of the discharge amount of the pump 22 can be supplied to the low clutch L/C.

Figure 6:
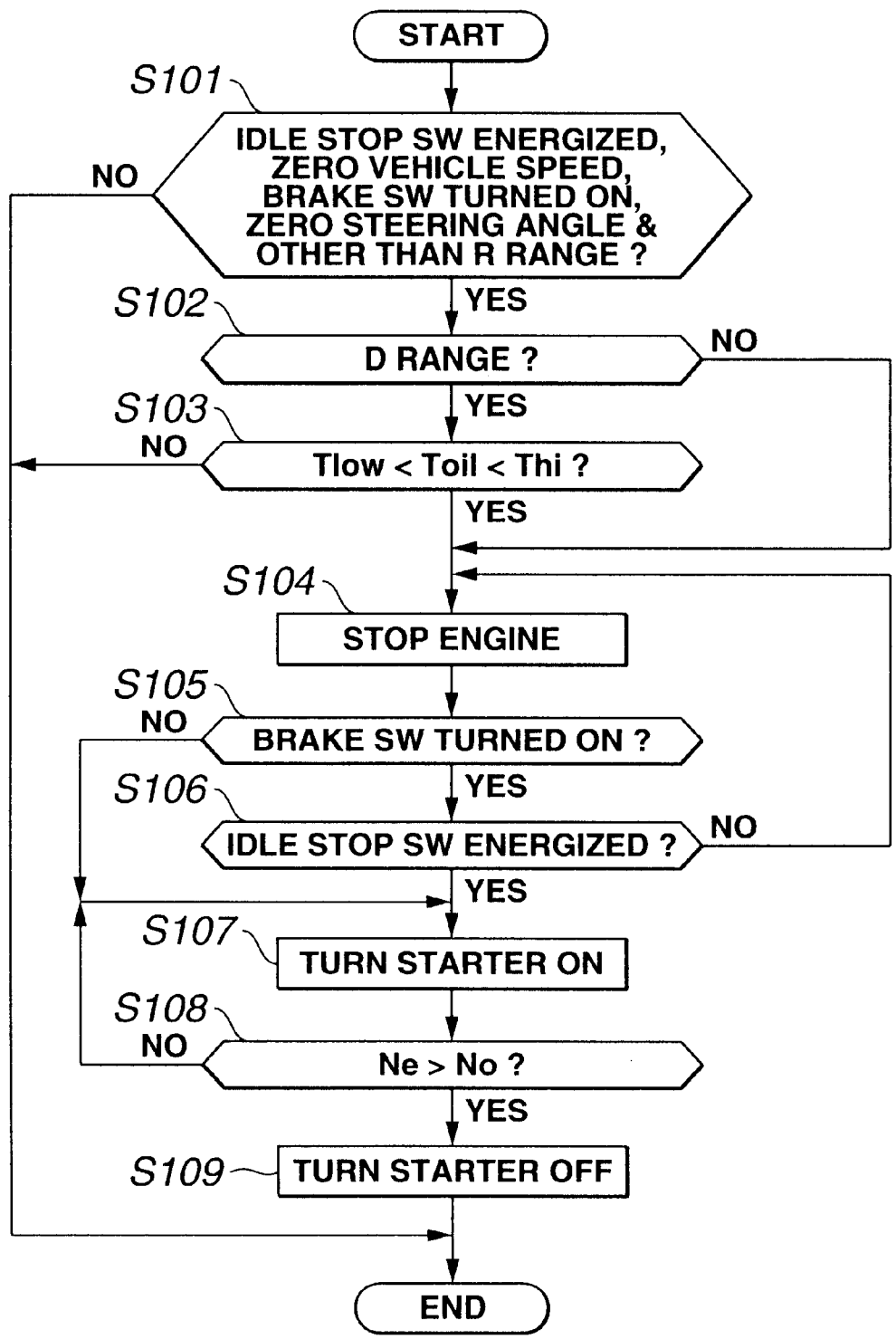
FIG. 6 is a flowchart illustrating operation of the first embodiment.

Referring to FIG. 6, the contents of idle-stop control in the first embodiment are described.

At a step S101, it is determined whether or not the idle-stop switch 1 is energized, the vehicle speed is zero, the brake switch 2 is turned on, the steering angle is zero, and the range other than the R range is selected. Only if it is determined that all the conditions are met, flow proceeds to a step S102. Otherwise, idle-stop control is cancelled.

At the step S102, it is determined whether or not the select position is the drive (D) range. If it is determined that the select position is the D range, flow proceeds to a step S103. Otherwise, flow proceeds to a step S104.

At the step S103, it is determined whether or not an oil temperature Toil is higher than a lower limit temperature Tlow and lower than an upper limit temperature Thi. If it is determined that the conditions are met, flow proceeds to a step S104. Otherwise, flow comes to an end.

At the step S104, processing to stop the engine 10 is carried out.

At a subsequent step S105, it is determined whether or not the brake switch 2 is turned on. If it is determined that the brake switch 2 is turned on, flow proceeds to a step S106. Otherwise, flow proceeds to the step S107.

At the step S106, it is determined whether or not the idle-stop switch 1 is energized. If it is determined that the idle-stop switch 1 is energized, flow proceeds to a step S107. Otherwise, flow returns to the step S104.

At the step S107, processing to actuate the starter generator 60 is carried out.

At a subsequent step S108, it is determined whether or not an engine speed Ne is greater than a predetermined engine speed No. If it is determined that Ne>No, flow proceeds to a step S109. Otherwise, flow returns to the step S107 to continuously carry out operation of the starter generator 60.

At the step S109, processing to turn the starter generator 60 off is carried out.

Specifically, if a driver wants idle-stop control, the vehicle is at a standstill, a brake pedal is depressed, the steering angle is zero, and the R range is not selected, the engine 10 is stopped. The idle-stop switch 1 is a device through which the driver transmits his/her intention to perform or cancel idle stop. At the point when turning an ignition key, the idle-stop switch 1 is in energization. The reason why it is required that the steering angle is zero is to prohibit idle stop at the time of temporary stop of the running vehicle at right-hand turn and the like, for example.

The reason why idle-stop control is prohibited at the R range is that the sufficient oil amount cannot be supplied since the oil amount required for achieving completion of engagement is far greater than that required for engagement at the first speed. Specifically, as shown in the engagement table in FIG. 3, at the first speed, the low clutch L/C needs supply of the hydraulic pressure. Thus, even in the state where the shift valves 41, 42 do not switch the hydraulic passages, the hydraulic pressure needs to be supplied to the low clutch L/C only through the bypass passage 45. However, at the R range, the hydraulic pressure should also be supplied to the reverse clutch R/C and the low and reverse brake L&R/B, which makes difficult the supply of the oil amount required for engagement before engine start.

Then, it is determined whether or not the oil temperature Toil is higher than the lower limit temperature Tlow and lower than the upper limit temperature Thi. The reason why such processing is carried out is that unless the oil temperature is higher than a predetermined value, the viscosity resistance of oil may not allow a predetermined oil amount to be charged before engine complete explosion, and that when the oil temperature is too higher, a decrease in volumetric efficiency of the pump 22 and an increase in leakage at valve parts due to reduction in viscosity resistance may not allow a predetermined oil amount to be charged before engine complete explosion.

Subsequently, when the brake pedal is released, it is determined that the driver has his/her intention to start the engine 10. Moreover, even with the brake pedal depressed, if it is shown that the idle-stop switch 1 is not energized, it is determined that the driver has his/her intention to start the engine 10. This determination aims to prevent the situation of impossible use of an air conditioner and the like due to a load applied to the battery when the engine 10 is stopped for idle stop, for example. That is, when feeling that the temperature in the cabin is high, the driver can cancel idle-stop control, allowing execution of control in further conformity with his/her intention. With this, the starter generator 60 is actuated to supply the hydraulic pressure to the second line-pressure passage 40.

At engine stop, the pump 22 is stopped, and thus the first switching valve 44 is switched by the return spring 44g to the state where the bypass passage 45 and the low clutch L/C are in communication. Specifically, at engine stop, hydraulic fluid supplied to the low clutch L/C is discharged from the hydraulic passage, leading to lowered hydraulic pressure. As a result, when the engine 10 is restarted, the low clutch L/C to be engaged at first-speed running is in disengagement, and thus requires supply of the hydraulic pressure at engine restart.

Then, after engine restart, during a time period of low hydraulic pressure due to insufficient discharge amount of the pump 22 rotated by the engine 10 through rotation (about 200 rpm) of the starter generator 60, the first switching valve 44 selects as a passage to the low clutch L/C the bypass passage 45 with less passage resistance, and closes the passage 101 provided with the orifice d1 and the low-clutch accumulator chamber 300, allowing supply of most of the discharge oil amount of the pump 22 to the low clutch L/C. This allows advanced engagement of the low clutch L/C at engine restart after idle stop, achieving completion of engagement of the low clutch L/C after engine complete explosion, resulting in elimination of a start shock of the vehicle.

Figure 7:
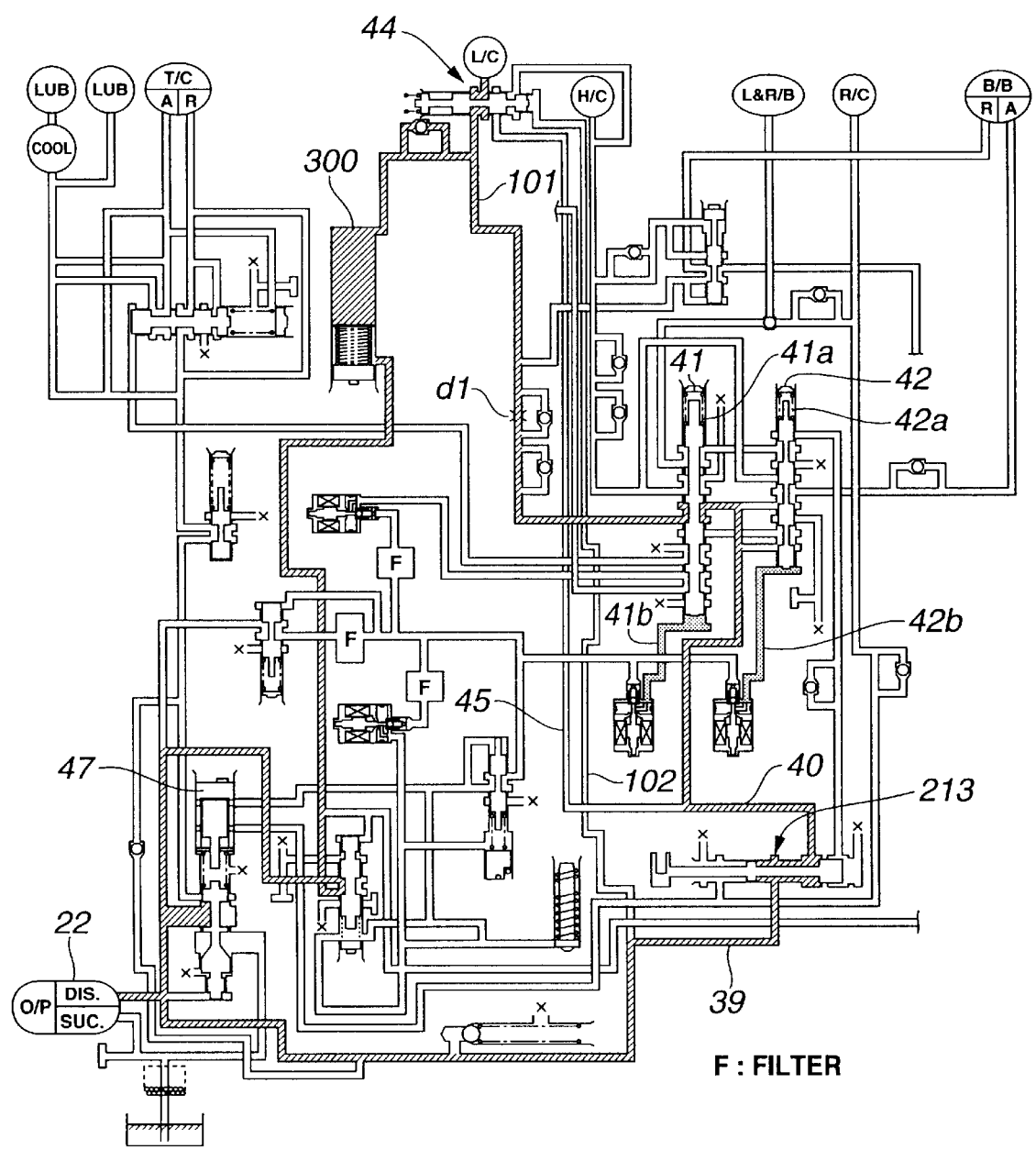
FIG. 7 is a view similar to FIG. 4, illustrating fluid flow after supply of the pilot pressure.

Subsequently, when engine rotation is stabilized at idle rotation (about 600 rpm), sufficient discharge amount of the pump 22 is secured, so that the hydraulic pressure within the switching line-pressure passage 102 to be supplied to the port 44e of the first switching valve 44 becomes greater than a predetermined value, urging the spool valve 44f to move leftward as seen in FIG. 5 against a reaction force of the return spring 44g. Thus, the low-clutch port 44b of the first switching valve 44 selects the normal engagement-pressure passage 101 to supply the hydraulic pressure to the diagonally shaded passages as shown in FIG. 7, avoiding a select shock in the normal idle rotation of the engine 10.

Referring to FIG. 3, at the first, second, and third speeds, the hydraulic pressure is basically supplied to the low clutch L/C, whereas at the fourth speed, supply of the hydraulic pressure to the low clutch L/C needs to be interrupted to prevent interlock thereof. If the normal pilot pressure is secured in a passage 104, supply of the hydraulic pressure to the low clutch L/C is interrupted by the shift valves 41, 42. In the event that the line pressure is momentarily decreased during forth-speed running, the line pressure is supplied through the bypass passage 45 to the first switching valve 44 and thus to the low clutch L/C which may fall in engagement, causing interlock.

In order to solve this problem, the switching line-pressure passage 102 communicates with the port 44e of the first switching valve 44 to provide an opposite pressure to a reaction force of the return spring 44g. Moreover, the high-clutch engagement pressure is provided to the port 44d from the interlock preventing passage 103 for supplying the high-clutch pressure produced at the third and fourth speeds, so that the first switching valve 44 is operated with the hydraulic pressure lower than that at which the shift valves 41, 42 begin to move by the spring reaction force, thus preventing interlock.

Figure 8:
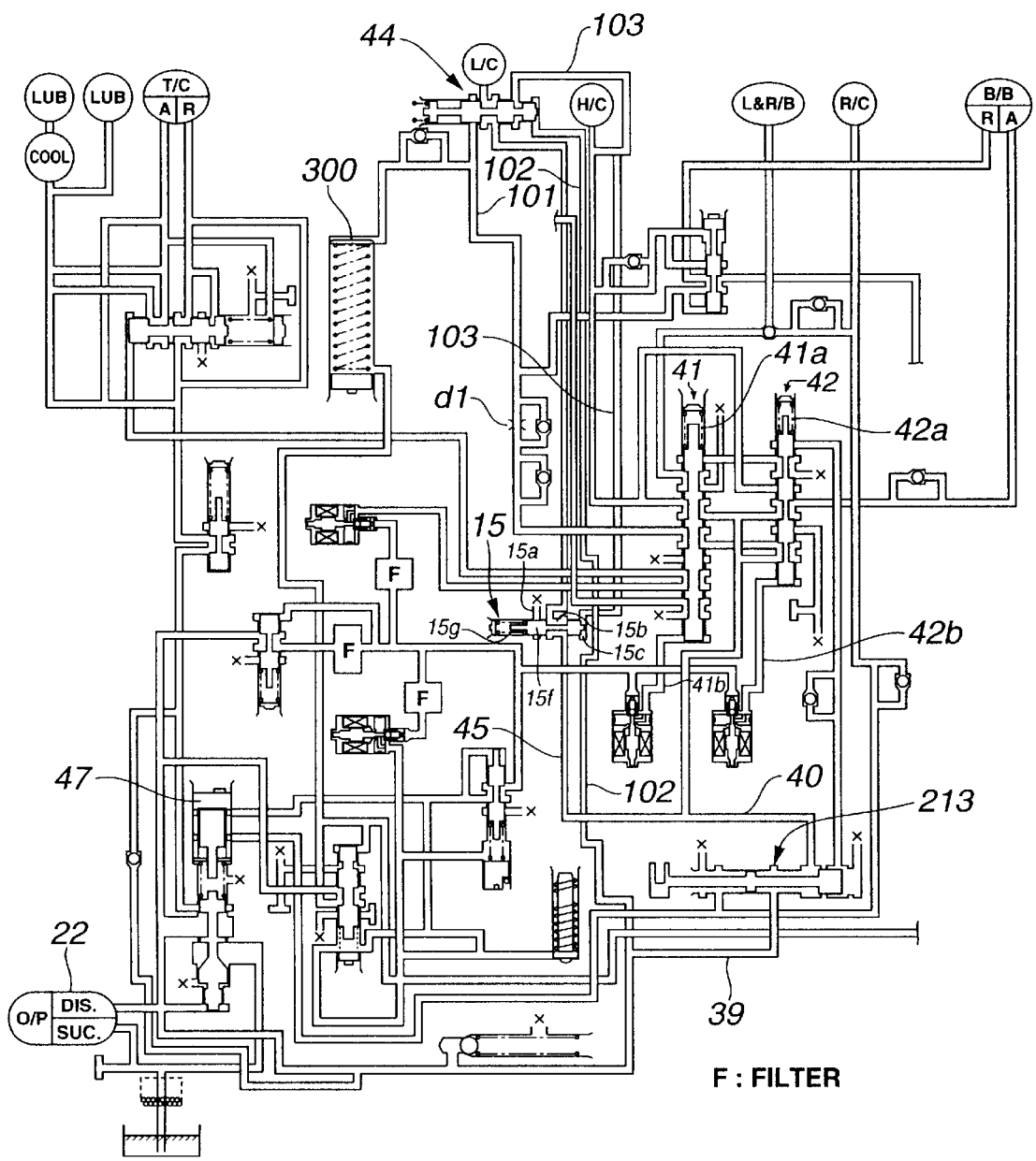
FIG. 8 is a view similar to FIG. 7, illustrating the hydraulic circuit having a second switching valve for preventing interlock.

Referring to FIG. 8, the interlock preventing means may include a second switching valve 15 arranged on the bypass passage 45 between the first switching valve 44 and the manual valve 213. The second switching valve 15 comprises a spool valve 15f and a return spring 15g. A port 15a communicates with a drain, a port 15b communicates with the line-pressure passage 102 with less passage resistance for supplying the low-clutch pressure, and a port 15c communicates with the second line-pressure passage 40 with less passage resistance downstream of the manual valve 213. The spool valve 15f communicates with the interlock preventing passage 103 with less passage resistance for supplying the high-clutch pressure.

With this, at the first and second speeds where the hydraulic pressure is not produced in the interlock preventing passage 103, the second switching valve 15 puts the bypass passage 45 in communication by a reaction force of the return spring 15g. At the third and fourth speeds, with the high-clutch pressure supplied through the interlock preventing passage 103, the second switching valve 15 interrupts the bypass passage 45. Thus, in the event that the first switching valve 44 malfunctions at the fourth speed to put the bypass passage 45 and the low clutch L/C in communication, supply of the hydraulic pressure to the low clutch L/C can be avoided.

The spool valve 44f of the first switching valve 44 is shaped to allow, at switching of the hydraulic passages, communication between the bypass passage 45 with less passage resistance and the passage 101 having the orifice d1 and the low-clutch accumulator chamber 300 in a underlapped way as shown by arrows in FIG. 5. With this, a reduction in low-clutch pressure is minimized immediately after switching of the first switching valve 44, preventing the low clutch L/C completely engaged from being disengaged momentarily at actuation of the first switching valve 44.

Next, operation of the first embodiment is described. As described above, in the first embodiment, there is no electric assist pump and the like in the earlier art, so that the situation can be prevented that its electric motor is continuously operated while engine idle is stopped by idle-stop control. Therefore, idle-stop control can be achieved without applying a load to the battery and the electric motor and at low cost.

Moreover, the bypass passage 45 is arranged to allow communication between the second line-pressure passage 40 downstream of the manual valve 213 and the point immediately upstream of the engagement element. The first switching valve 44 is arranged on the bypass passage 45 to switch between the communicating state and the non-communicating state for the bypass passage 45 and the low clutch L/C.

Specifically, in the earlier art, the hydraulic circuit for an automatic transmission comprises a shift valve for switching the hydraulic passages for supplying to the engagement elements the hydraulic pressure produced by the oil pump. The shift valve is actuated to switch the hydraulic passages, allowing engagement of the engagement elements. By way of example, at first-speed start, the pilot pressure is supplied to the shift valve, thus supplying the engagement pressure to the forward engagement element. However, switching of the hydraulic passages by the shift valve needs a certain hydraulic pressure, which is produced after charging hydraulic fluid in the hydraulic passages having fluid discharged therefrom once, requiring certain time for charging hydraulic fluid. As a result, if switching of the hydraulic passages is not performed by the shift valve, the hydraulic pressure is supplied to the low clutch L/C, a release chamber and apply chamber of the band brake B/B, and the high clutch H/C as shown, e.g. in FIG. 14, achieving the third speed as shown in FIG. 3. Then, in the first embodiment, the bypass passage 45 is provided to the low clutch L/C for achieving first-speed engagement so as to supply hydraulic fluid to the hydraulic passages having fluid discharged therefrom without waiting switching of the hydraulic passages by the shift valve, through which hydraulic fluid is directly supplied to the point immediately upstream of the low clutch L/C, allowing quick supply of sufficient engagement pressure thereto.

Moreover, the normal engagement-pressure passage 101 downstream of the manual valve 213 is provided with the orifice d1, the low-clutch accumulator chamber 300 and the like. Thus, when the discharge amount of the oil pump is small, i.e. the line pressure is lower than a predetermined value, such as at cranking by the starter generator 60, the passage 101 has greater passage resistance, and supply of the engagement pressure to the low clutch L/C can be delayed until the hydraulic fluid is accumulated in the low-clutch accumulator chamber 300. On the other hand, in the first embodiment, the bypass passage 45 with minimum passage resistance is arranged to allow supply of the engagement pressure without passing through the passage resistances such as the orifice 1 and the accumulator chamber 300, allowing quick supply of sufficient engagement pressure to the low clutch L/C.

Further, the first switching valve 44 is connected to the normal engagement-pressure passage 101 and the bypass passage 45 to allow switching between the passage 101 and the bypass passage 45 in a underlapped way. Specifically, after supplying the line pressure to the low clutch L/C through the bypass passage 45, the normal control pressure is built up. And when the first switching valve 44 switches from the bypass passage 45 to the passage 101, the engagement pressure to be supplied is supplied to the valve 44 without interruption, allowing prevention of a reduction in engagement pressure of the low clutch L/C at switching. Thus, during normal running, smooth driving can be ensured without having an influence on speed change control of the automatic transmission and the like.

Still further, the first switching valve 44 comprises spool valve 44f and return spring 44g to control the communicating state and the non-communicating state in accordance with the relationship between the line pressure supplied through the switching line-pressure passage 102 and the return spring 44g. The bypass passage 45 and the low clutch L/C is put in communication by a reaction force of the return spring 44g, allowing secure supply of the hydraulic pressure to the low clutch L/C even if no line pressure exists. Moreover, when the line pressure which acts on the first pressure acting portion 44h of the spool valve 44f becomes greater than a predetermined value, the first switching valve 44 is switched to the non-communicating state against a reaction force of the return spring 44g, allowing switching by a single switching valve without requiring complicated control, resulting in achievement of the switching valve with simple construction, high reliability, and low manufacturing cost.

Furthermore, the spool valve 44f includes second pressure acting portion 44i on which the engagement pressure supplied through the interlock preventing passage 103 acts. When the engagement pressure is supplied through the interlock preventing passage 103, the second pressure acting portion 44i puts the first switching valve 44 in non-communication against a reaction force of the return spring 44g. Thus, during running, if the line pressure becomes lower than a predetermined value due to coasting and the like so as to lower the line pressure which acts on the first pressure acting portion 44h of the spool valve 44f, the engagement pressure of the high clutch H/C acts on the second pressure acting portion 44i of the spool valve 44f, preventing communication between the low clutch L/C and the bypass passage 45, allowing secure prevention of interlock thereof.

Figure 9:
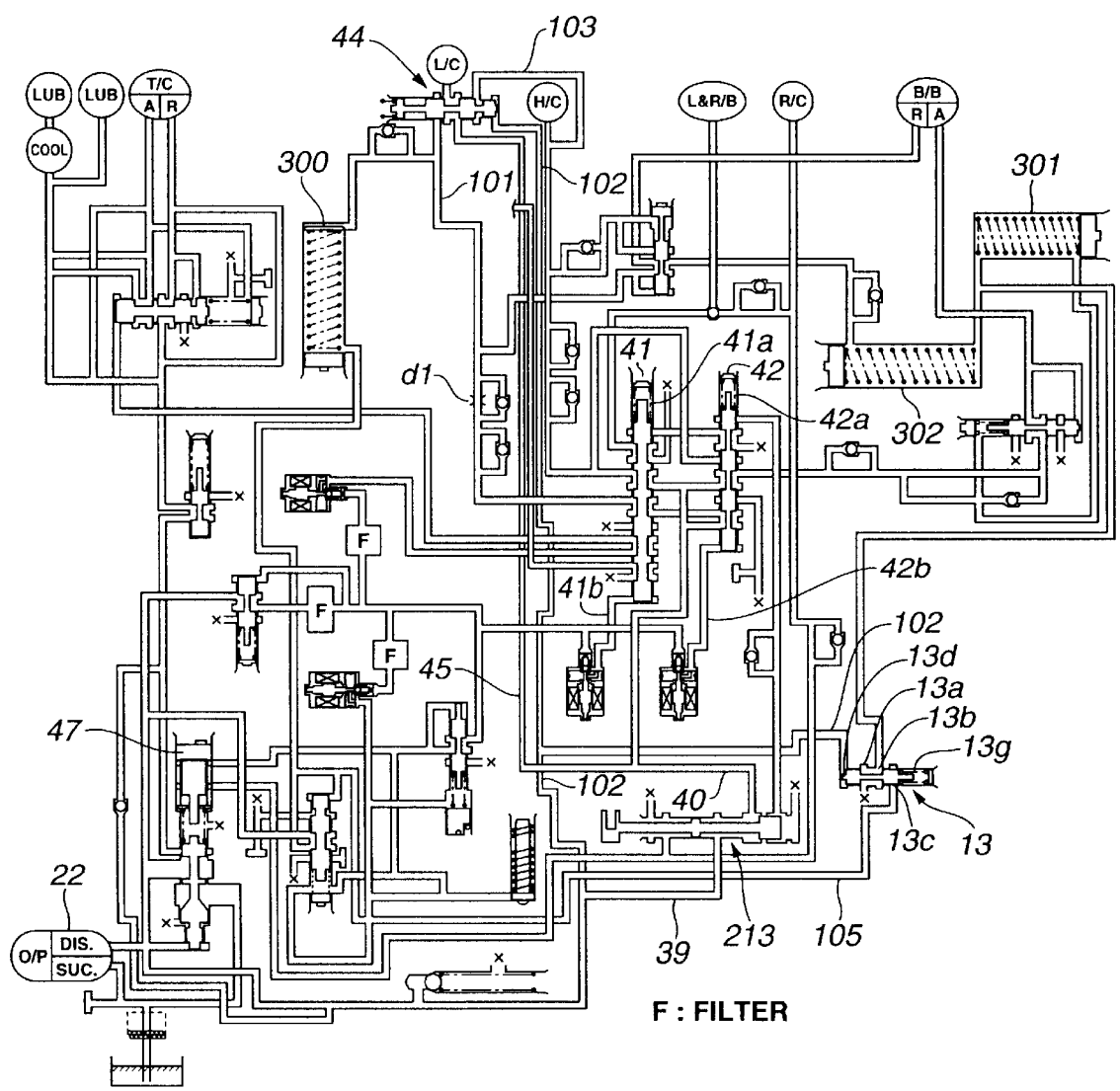
FIG. 9 is a view similar to FIG. 8, illustrating a second embodiment of the present invention.

Referring to FIG. 9, there is shown the second embodiment of a hydraulic circuit for supplying the control pressure. The second embodiment is the same in fundamental constitution as the first embodiment except that a third switching valve 13 is arranged on an accumulator passage or fourth hydraulic passage 105 for supplying the hydraulic pressure to an accumulator chamber 301 used at 1–2 shift and an accumulator chamber 302 used at 2–3 shift.

The third switching valve 13 comprises a spool valve 13f and a return spring 13g. A port 13a communicates with a drain, a port 13b communicates with a passage to the accumulator chambers 301, 302, a port 13c communicates with a passage from the pump 22, and a port 13d communicates with the line-pressure passage 102 before passage of the manual valve 213.

The third switching valve 13 uses the line pressure within the line-pressure passage 102 before passage of the manual valve 213 as an opposite pressure to a reaction force of the spring 13g. Immediately after restart where no line pressure is produced within the line-pressure passage 102, the third switching valve 13 interrupts the passage 105 to the accumulator chambers 301, 302 so as to avoid a delay of engagement of the low clutch L/C. After completion of engagement of the low clutch L/C, the valve 13 puts the hydraulic passages to the accumulator chambers 301, 302 in communication.

Specifically, at engine restart, the hydraulic pressure needs to be supplied to the low clutch L/C before everything. On the other hand, the hydraulic pressure may be supplied to the accumulator chambers 301, 302 used at shift carried out by engaging the other engagement elements than the low clutch L/C after sufficient output of the pump 22 is secured after engine complete explosion. This will raise no problem on running of the vehicle. Rather, when output of the pump 22 is insufficient at engine restart, interruption of the hydraulic pressure to the accumulator chambers 301, 302 allows quicker supply of sufficient engagement pressure to the low clutch L/C.

A biasing force of each return springs 44g, 13g of the first and third switching valves 44, 13 is set, preferably, such that the valve is switched when the line pressure is slightly higher than a value at which the low clutch L/C can be engaged. The reason is that at the stage that sufficient engagement pressure is not supplied to the low clutch L/C, sufficient discharge amount of the pump 22 may not be secured, causing a start shock.

If basing forces of the return springs 44g, 13g are set to correspond to the same switching pressure, the volume of hydraulic fluid supplied to the accumulator chambers 301, 302 is abruptly increased at the instant when the line pressure reaches that set pressure, which may reduce the hydraulic pressure. In that case, it is desirable to shift the hydraulic-pressure switching timings of the return springs 44, 13.

Figure 10:
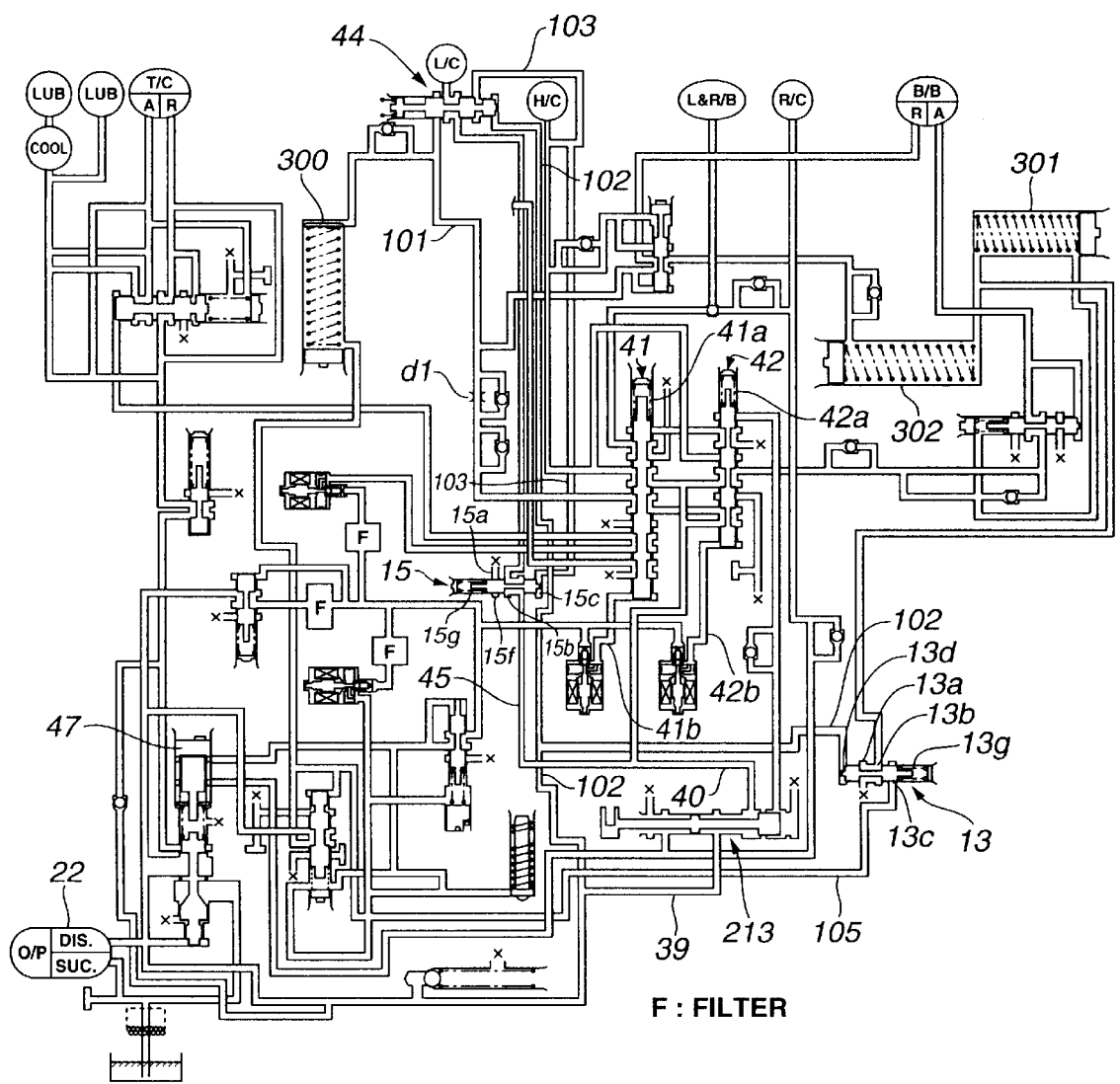
FIG. 10 is a view similar to FIG. 9, illustrating a third embodiment of the present invention.

Referring to FIG. 10, there is shown the third embodiment of a hydraulic circuit for supplying the control pressure, which comprises two switching valves in the first and second embodiments: second switching valve 15 arranged on the bypass passage 45 for preventing interlock, and third switching valve 13 for switching the hydraulic passage for supplying the hydraulic pressure to the accumulator chambers. Since the switching valves 15, 13 are actuated in the same way as those in the above embodiments, a description about the valves is not made here.

Figure 11:
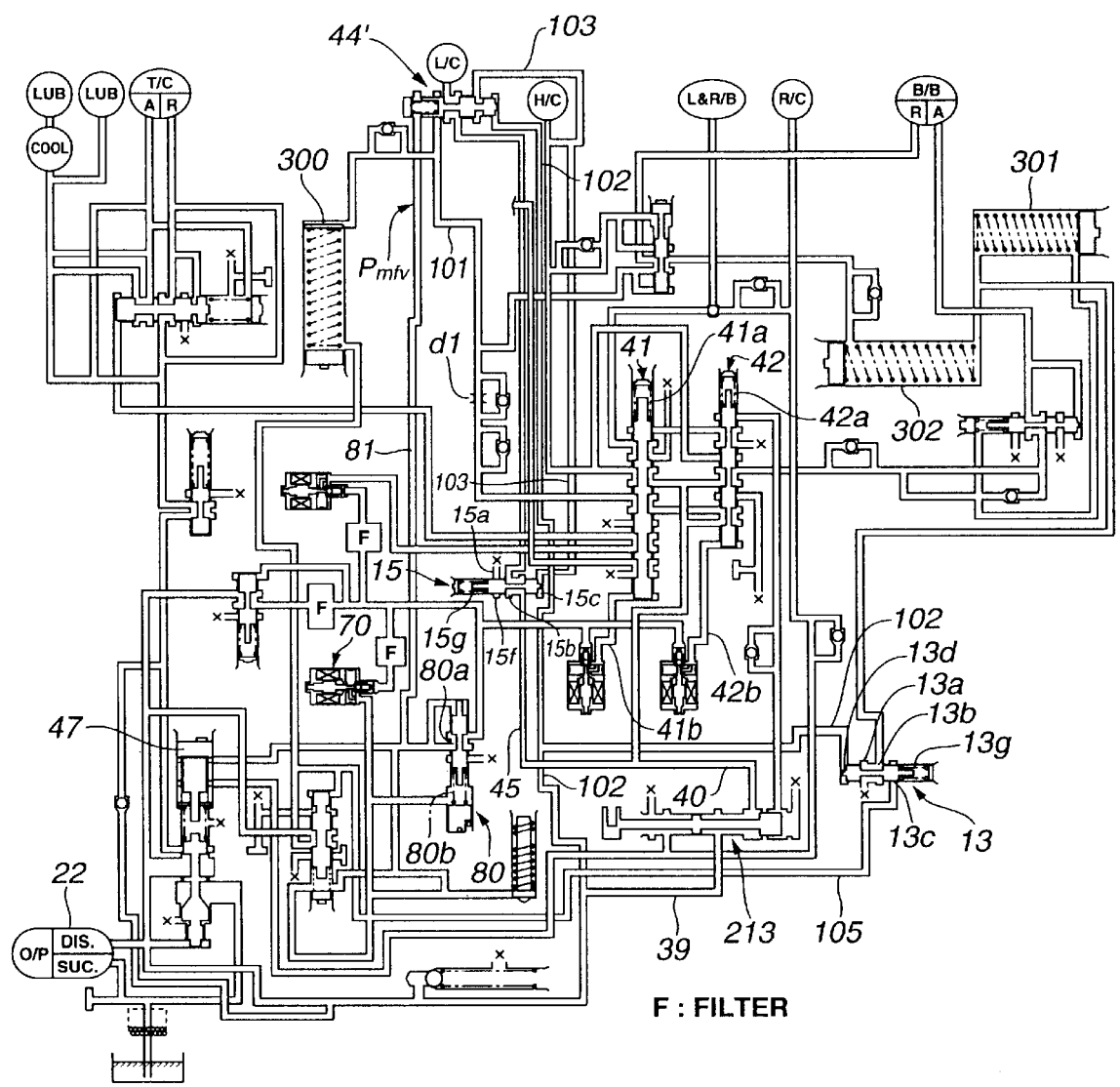
FIG. 11 is a view similar to FIG. 10, illustrating a fourth embodiment of the present invention.

Referring to FIG. 11, there is shown the fourth embodiment of a hydraulic circuit for supplying the control pressure, which is substantially the same as the third embodiment except that it comprises a hydraulic passage or assist mechanism 81 for communication between a first switching valve 44' having constitution different from that of the first switching valve 44 in the third embodiment and a pressure modifying valve 80. Only a difference from the contents described in the above embodiments is described in detail.

The first switching valve 44 in the above embodiments has a switching set pressure determined only in accordance with a set load of the spring. Thus, if the vehicle starts at full throttle immediately after engine restart, torque for low-clutch engagement is insufficient, which may produce a great shock. Moreover, pressure loss is produced in the low-clutch passage due to passage resistance, which may lower actual low-clutch pressure. Further, pressure loss is affected by the oil temperature, which may degrade the control-ability.

In view of the above problems, it is conceivable that a set load of the spring of the first switching valve 44 is increased to have sure communication between the bypass passage 45 and the low clutch L/C until sufficient hydraulic pressure is secured from the pump 22. Then, when sufficient hydraulic pressure is obtained from the pump 22, communication between the bypass passage 45 and the low clutch L/C is switched after securing the hydraulic pressure against the spring, removing the above problems. However, when selecting N-D during normal operation where sufficient hydraulic pressure is secured from the pump 22, the hydraulic pressure is supplied from the shift valve supplies to the low clutch L/C as is usual, wherein if a spring set load is too great, the bypass passage 45 and the low clutch L/C are in communication early, which may produce a select shock and the like. Then, the fourth embodiment provides a hydraulic circuit using existing signal pressure and without having a greater increase in spring set load than necessary, which allows smooth supply of the hydraulic pressure even if the vehicle starts at full throttle immediately after engine restart subsequent to idle stop, and prevention of a select shock and the like during normal control.

Figure 12:
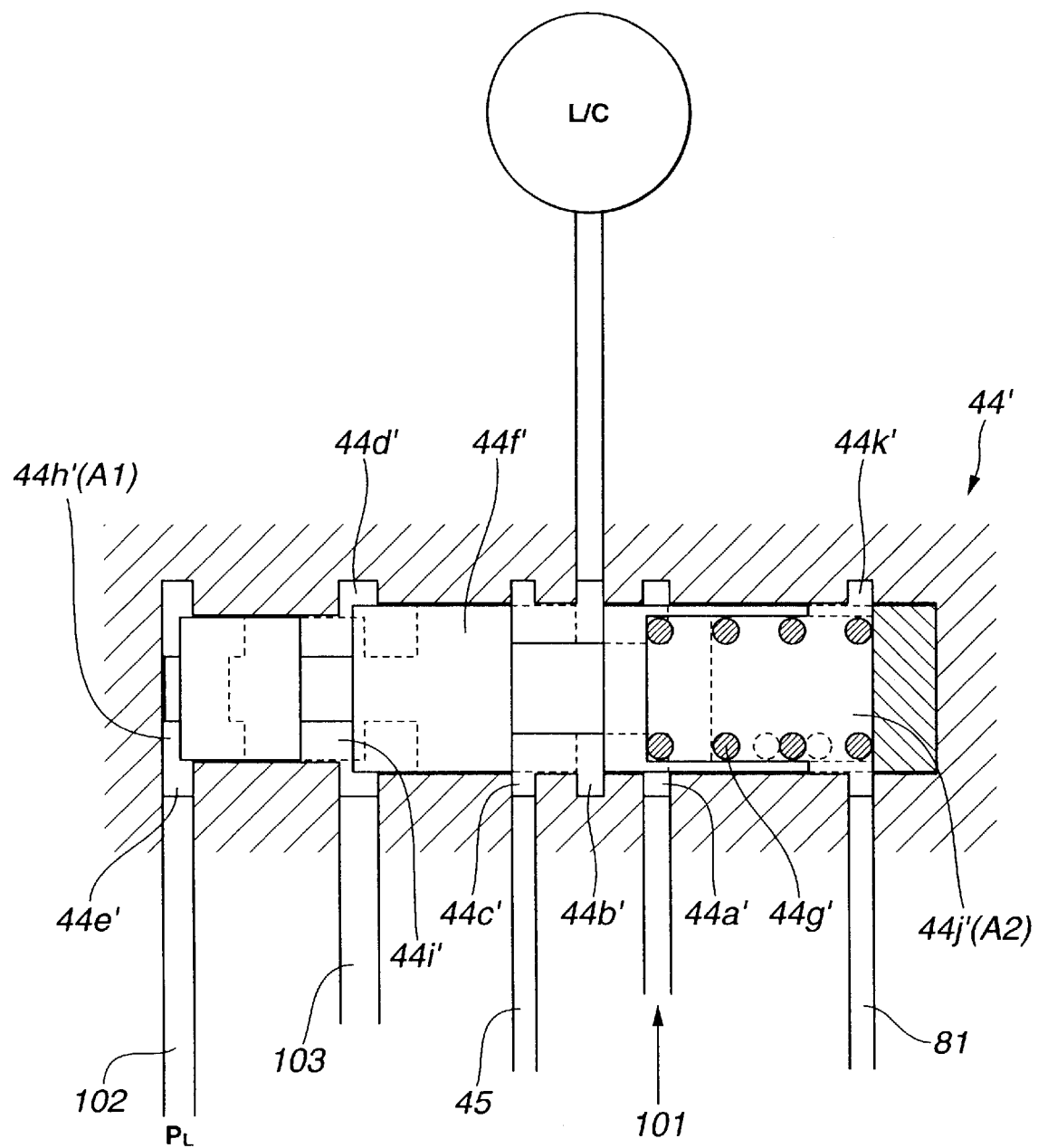
FIG. 12 is a view similar to FIG. 5, showing a first switching valve in FIG. 11.

Referring to FIG. 12, the first switching valve 44' comprises a spool valve 44f and a return spring 44g'. The spool valve 44f includes a first pressure acting portion 44h' having a pressure acting area A1 and on which the hydraulic pressure opposite to a reaction force of the return spring 44g' acts, and a second pressure acting portion 44i'. The first pressure acting portion 44h' communicates with the switching line-pressure passage 102 before passage of the manual valve 213 through a port 44e'. The second pressure acting portion 44i' communicates with the interlock preventing passage 103 for supplying the engagement pressure of the high clutch H/C through a port 44d'.

Figure 14:
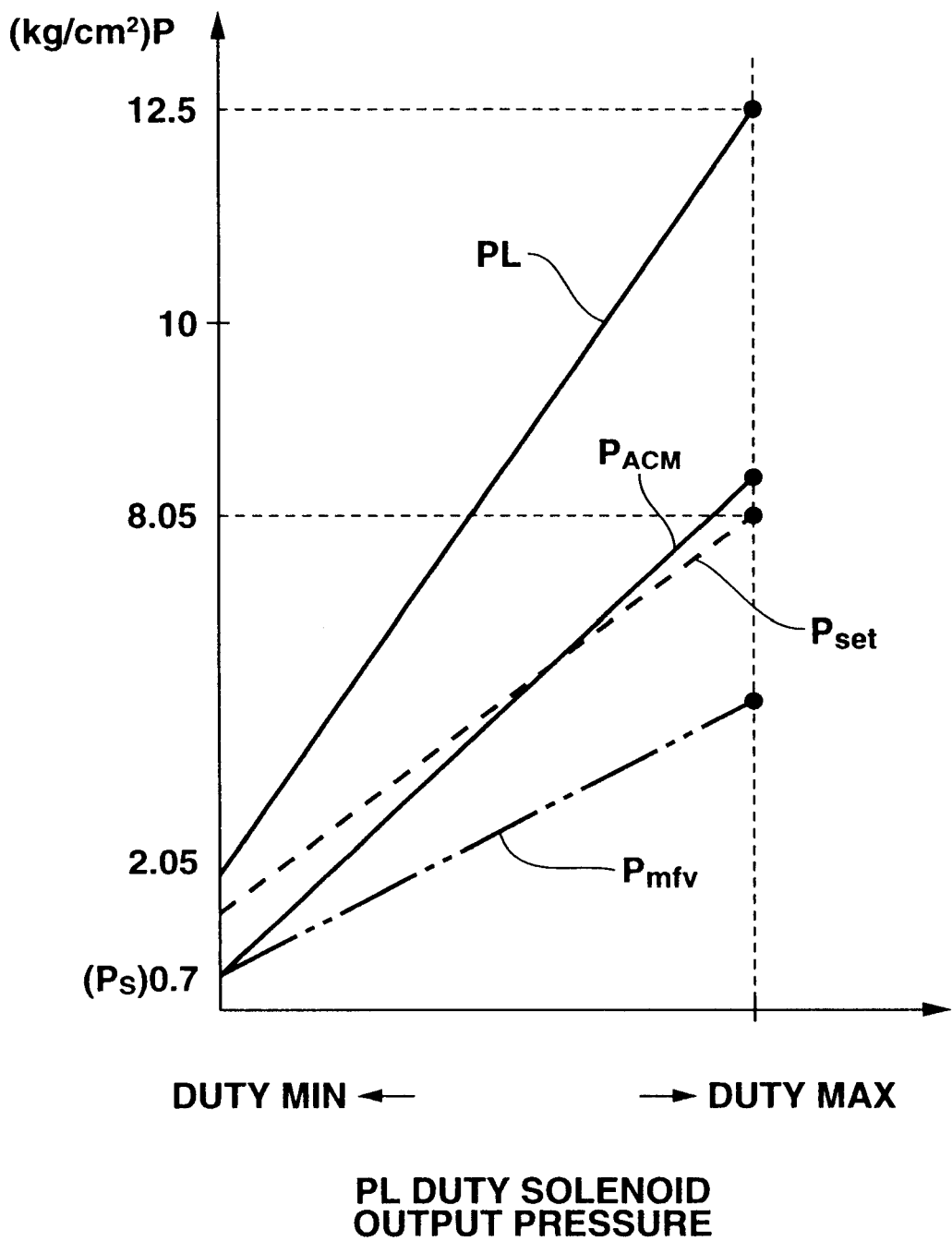
FIG. 14 is a graph illustrating the relationship between the output pressure of a line-pressure duty solenoid and the pressure in hydraulic passages.

A compartment 44j' having a pressure acting area A2 and for accommodating the return spring 44g' is formed with a port 44k' communicating with the passage 81. The passage 81 is connected to an output port 80a of the pressure modifying valve 80. Referring to FIG. 14, the output port 80a of the pressure modifying valve 80 produces a hydraulic pressure Pmfv in accordance with the duty ratio of a line-pressure duty solenoid 70 (see FIG. 11). When the duty ratio of the line-pressure duty solenoid 70 is zero, the hydraulic pressure Pmfv is about 0.7 kg/cm$^2$ which equilibrates a set load Pkx0 of a spring 80b of the pressure modifying valve 80, whereas when the duty ratio is maximum, it is about 4.7 kg/cm².

A port 44a' communicates with the normal low-clutch pressure passage 101 provided with the orifice d1 and the low-clutch accumulator chamber 300. A port 44b' communicates with the low clutch L/C. A port 44c' communicates with the bypass passage 45 with less passage resistance. When the sum of a set load kx0 of the return spring 44g' and a value obtained by multiplying the hydraulic pressure Pmfv output by the pressure modifying valve 80 to operate in the compartment 44j' by the pressure acting area A2 is greater than a value obtained by multiplying the line pressure PL acting on the first pressure acting portion 44h' by the pressure acting area A1, i.e. kx0+Pmfv×A2>PL×A1, the first switching valve 44' is in the state as shown by fully drawn line in FIG. 12 wherein the port 44b' communicates with the port 44c' so that the hydraulic pressure downstream of the manual valve 213 enters the low clutch L/C through the bypass passage 45.

When a value kx0/A1 obtained by dividing the set load kx0 of the return spring 44g' by the pressure acting area A1 is expressed by Ps, a set pressure Pset is defined by Pset=Ps+Pmfv×A2/A1, where Ps (=kx0/A1) is about 1 kg/cm², and A2/A1 is 1 or more, e.g. 1.5.

If Pset>PL, the first switching valve 44' is in the state as shown by fully drawn line in FIG. 12, whereas if Pset<PL, it is in the state as shown by broken line in FIG. 12, i.e. the low clutch L/C communicates with the normal hydraulic circuit communicating with the orifice d1 and the low-clutch accumulator chamber 300.

Figure 13:
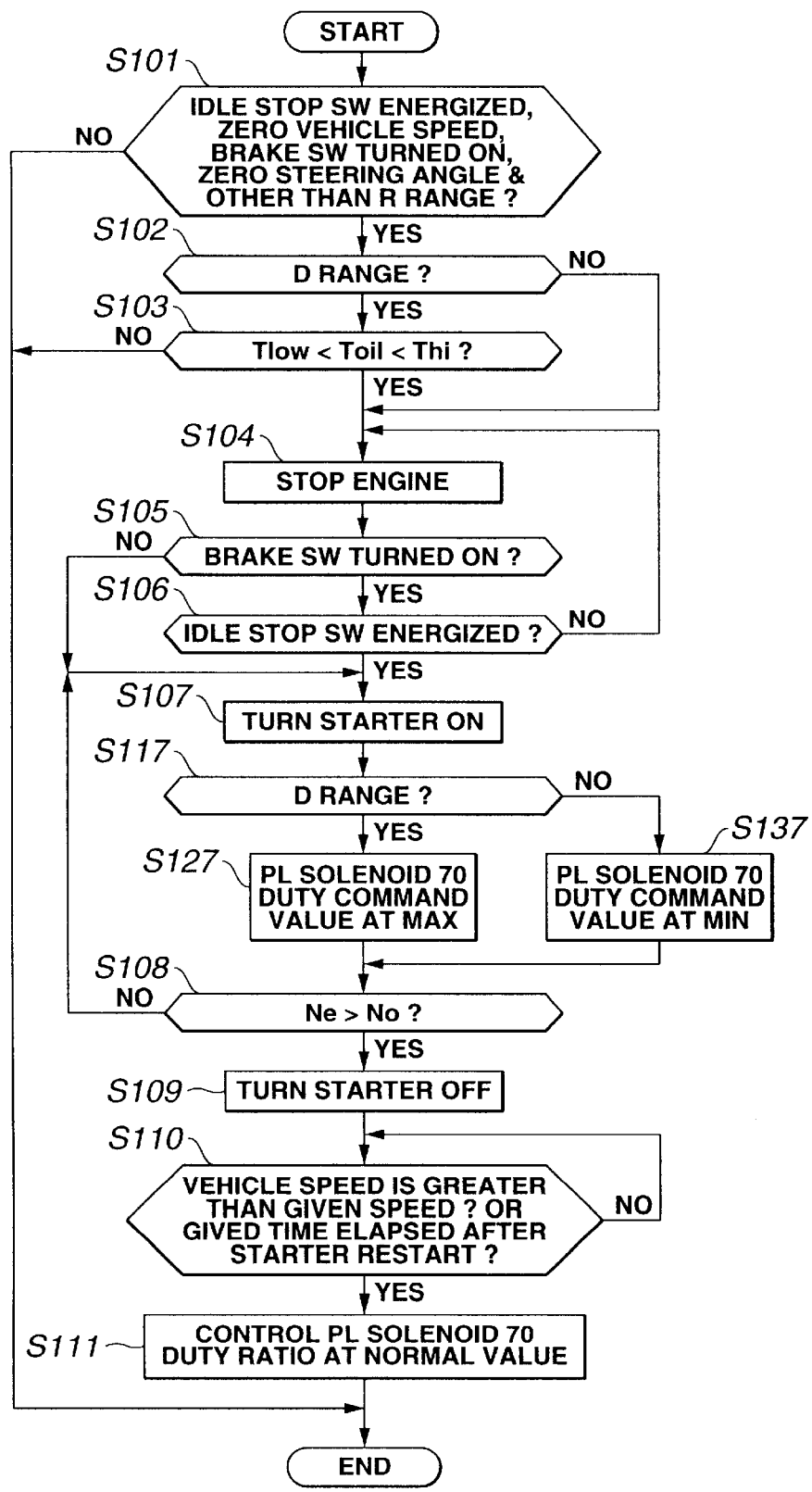
FIG. 13 is a chart similar to FIG. 6, illustrating operation of the fourth embodiment.

Referring to FIG. 13, the contents of idle-stop control in the fourth embodiment are described, which are substantially the same as those in the first embodiment. The following is a description about different steps only.

At a step S117, it is determined whether or not the select position is the D range. If it is determined that the select position is the D range, flow proceeds to a step S127. Otherwise, flow proceeds to a step S137.

At the step S127, due to restart required at the D range, processing is carried out to output a maximum command value MAX of the duty ratio of the line-pressure duty solenoid 70.

At the step S137, due to no restart required at the D range, processing is carried out to output a minimum command value MIN of the duty ratio of the line-pressure duty solenoid 70.

At a step S110, it is determined whether or not the vehicle speed is higher than a predetermined speed, or a predetermined time elapsed after starter restart. If the conditions are not met, processing at the step S110 is repeatedly carried out, whereas they are met, flow proceeds to a step S111 where the duty ratio of the line-pressure duty solenoid 70 is set at a normal command value.

Specifically, when the engine is normally operated at the idle rpm or more, and the duty ratio of the line-pressure duty solenoid 70 is set at the maximum command value MAX, the line pressure PL is adjusted at 12.5 kg/cm² as shown in FIG. 14. On the other hand, when the duty ratio of the line-pressure duty solenoid 70 is zero, the set pressure Pset is equal to 1+0.7×1.5=2.05 kg/cm², i.e. Pset>PL. When the duty ratio of the line-pressure duty solenoid 70 is set at the maximum command value MAX, the line pressure PL is equal to 12.5 kg/cm², and the set pressure Pset is equal to 1+4.7×1.5=8.05 kg/cm², i.e. Pset<PL. At all duty ratios other than the above, the relation Pset<PL is obtained wherein during normal operation, the first switching valve 44' is in the state as shown by broken line in FIG. 12, i.e. the low clutch L/C communicates with the normal hydraulic circuit communicating with the orifice d1 and the low-clutch accumulator chamber 300.

Figure 15:
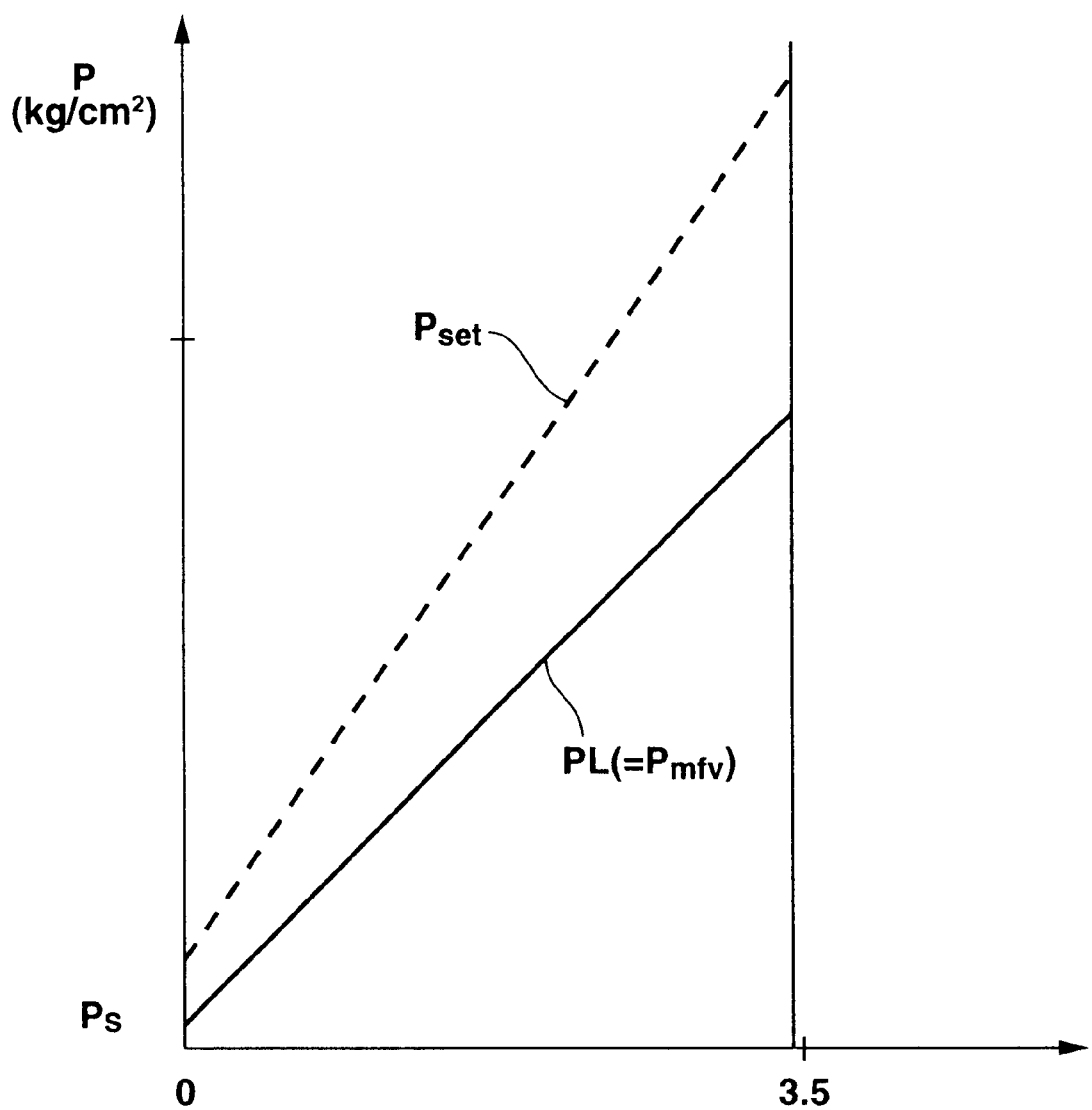
FIG. 15 is a graph similar to FIG. 14, illustrating the relationship between the discharge pressure of a main pump and the line pressure immediately after engine restart.

On the other hand, at engine restart at the D range after idle stop, processing is carried out to turn the starter generator 60 on, and output the maximum command value MAX of the duty ratio of the line-pressure duty solenoid 70 as shown at the step S127 in FIG. 13. Then, during a time period where the normal minimum line pressure of 3.5 kg/cm² is not secured, the pump 22 provides a discharge pressure which cannot be used as the line pressure, i.e. the hydraulic pressure in the pump discharging state, which is equal to the hydraulic pressure Pmfv. Thus, referring to FIG. 15, during this period, the set pressure Pset is always greater than the line pressure PL, so that the first switching valve 44' becomes in the state as shown by fully drawn line in FIG. 12.

As shown at the step S111 in FIG. 13, a command for releasing the maximum command value MAX of the duty ratio of the line-pressure duty solenoid 70 is generated when the vehicle speed is greater than a predetermined speed, or a predetermined time elapsed after the starter is turned on. Thus, if the discharge pressure of the pump 22 reaches 8.05 kg/cm² during that period, the relation Pset<PL is obtained, so that the first switching valve 44' becomes in the state as shown by broken line in FIG. 12. Therefore, the bypass passage 45 with less passage resistance serves to supply the line pressure to the low clutch L/C after engine restart, and it is switched to the normal hydraulic passage after the pump power is increased sufficiently, allowing completion of engagement of the low clutch L/C before build-up of engine torque after engine restart. Moreover, since the duty ratio of the line-pressure duty solenoid 70 is controlled at a maximum immediately after engine restart, sufficient torque for engaging the low clutch L/C can be secured regardless of the throttle opening after engine restart.

As described above, in the fourth embodiment, the first switching valve 44' is means comprising spool valve 44f', return spring 44g', and pressure modifying valve 80 for controlling the communicating state and the non-communicating state in accordance with the relationship between the line pressure supplied through the switching line-pressure passage 102 and the sum of the output pressures of the return spring 44g' and the pressure modifying valve 80. Thus, the return spring 44g' can provide not only a biasing force having a value not changeable from an initially set value, but a biasing force having a value changeable by electronic control, securing the degree of freedom for setting of the switching timing of the first switching valve 44'.

Moreover, the pressure modifying valve 80 is used to control switching of the first switching valve 44', so that actuation of the first switching valve 44' can be assisted using an existing signal pressure, achieving the above-mentioned operation without adding a new constitution.

Further, a command for the maximum hydraulic pressure is output to the pressure modifying valve 80 during a predetermined time period immediately after engine restart. This allows switching of the first switching valve 44' only after sufficient line pressure is secured, resulting in sufficient engaging force of the low clutch L/C after engine restart.

In the fourth embodiment, the hydraulic pressure for biasing the return spring 44g' is supplied from the pressure modifying valve 80 supplies. Alternatively, the hydraulic pressure opposite to the return spring 44g' can be reduced to adjust thereby a biasing force of the return spring 44g'.

Figure 16:
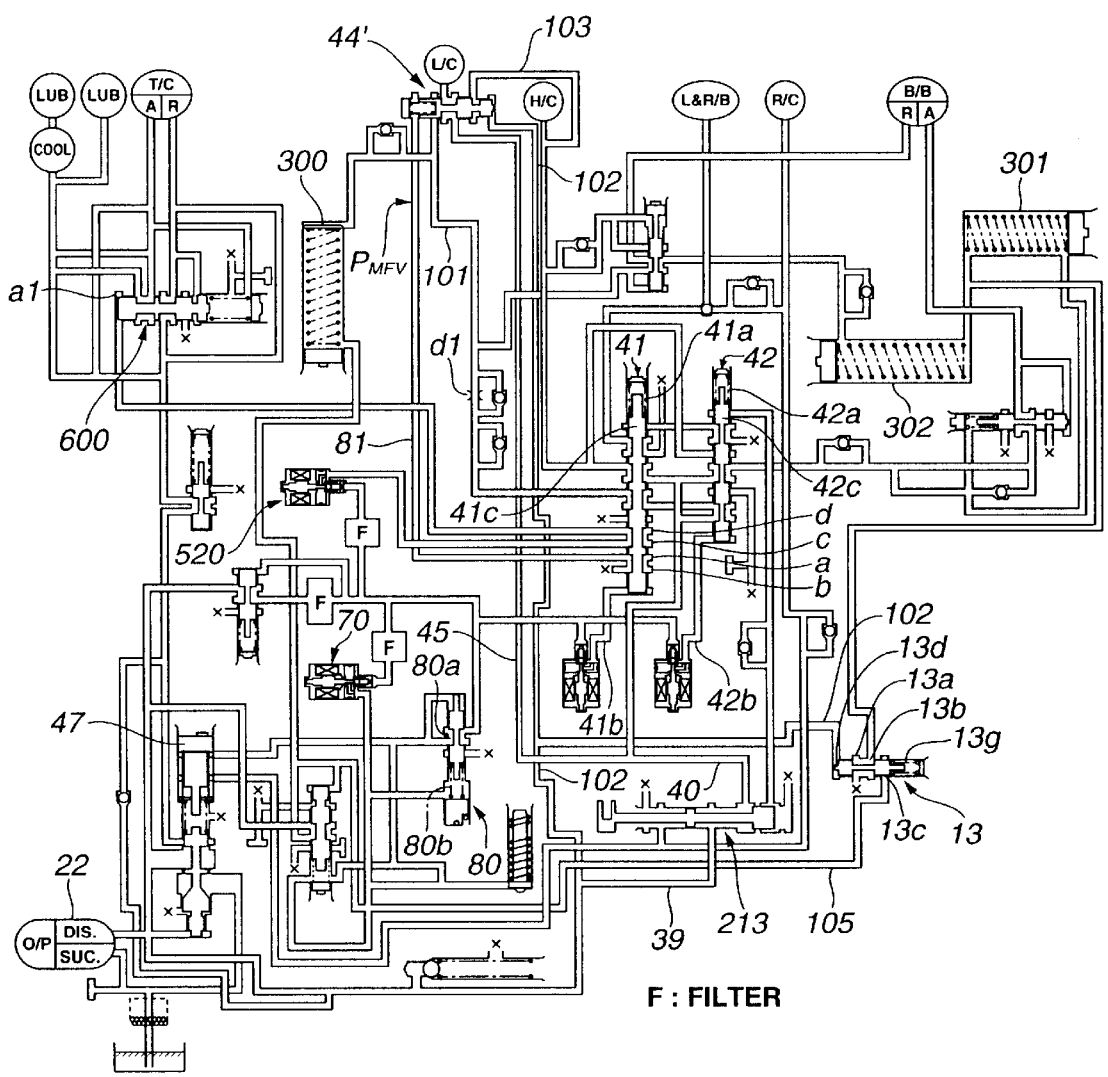
FIG. 16 is a diagram similar to FIG. 11, illustrating a fifth embodiment of the present invention.

Referring to FIG. 16, there is shown the fifth embodiment of a hydraulic circuit for supplying the control pressure, which is substantially the same as the fourth embodiment except that it comprises a lockup solenoid 520 for controlling actuation of a lockup control valve 600 for controlling the apply pressure and the release pressure of a lockup clutch in place of the pressure modifying valve 80 in the fourth embodiment. The second switching valve 15 is not provided in the hydraulic circuit in the fifth embodiment, alternatively, it may be provided therein. Only a difference from the contents described in the fourth embodiment is described in detail.

The passage 81 communicates with a port "a" of the first shift valve 41. An output port of the lockup solenoid 520 communicates with a port "c" of the first shift valve 41.

At the first and second speeds, the first shift valve 41 has a first shift solenoid 41c turned on, wherein a spool valve is located in the upper position against a load of a spring 41a. Then, the ports "a", "c" of the first shift valve 41 communicate with each other, so that the output pressure of the lockup solenoid 520 is led to the compartment 44j' of the first switching valve 44' through the passage 81.

On the other hand, at the third and fourth speeds, the first shift valve 41 has first shift solenoid 41c turned off, wherein the spool valve is located in the lower position by a load of the spring 41a. In this state, the compartment 44j' of the first switching valve 44' is drained through the passage 81 and the ports "a", "b" of the first shift valve 41. And the output pressure of the lockup solenoid 520 is led to a port "a1" of the lockup control valve 600 through ports "c", "d" of the first shift valve 41.

Figure 17:
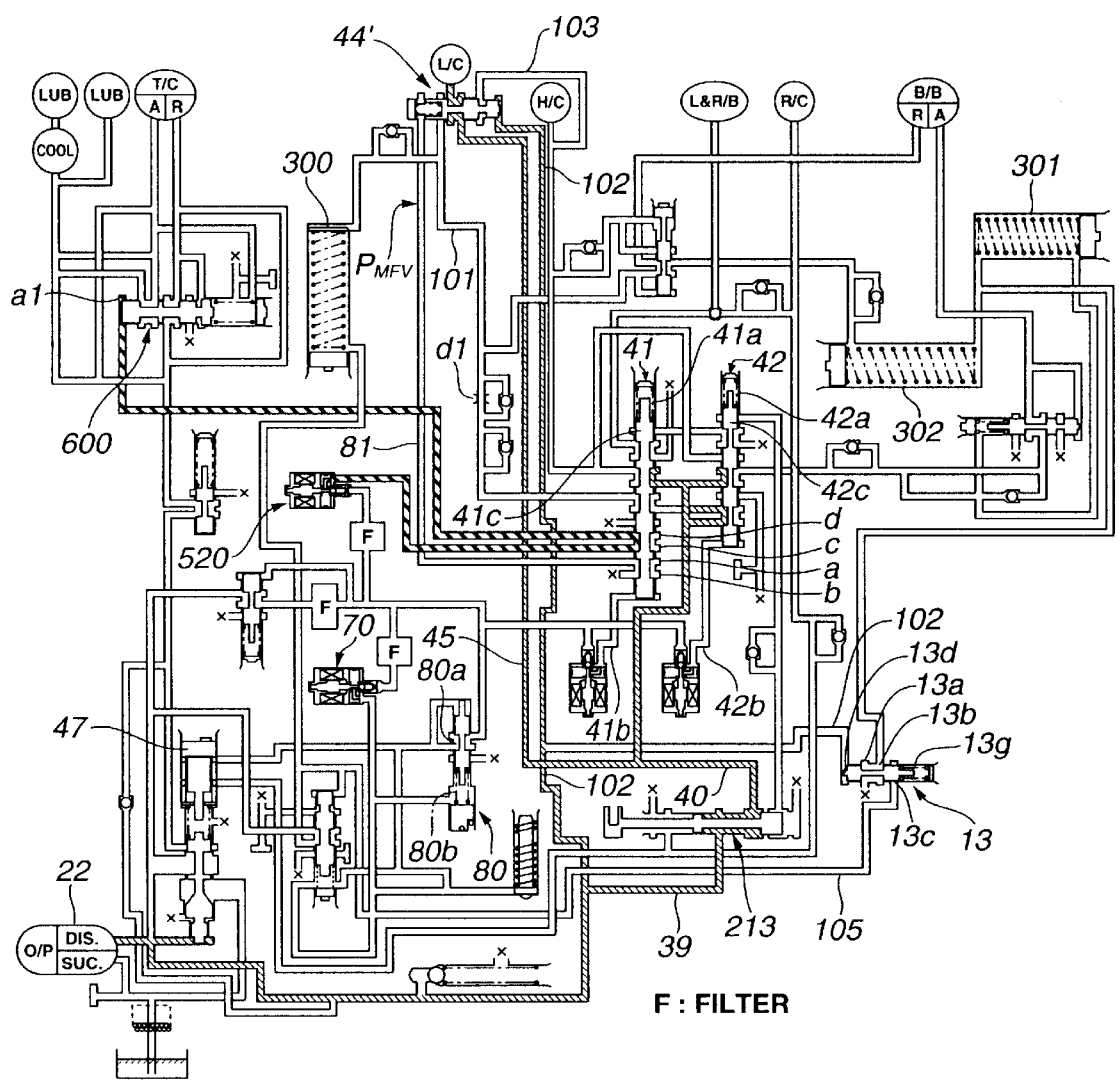
FIG. 17 is a diagram similar to FIG. 16, illustrating supply of the hydraulic pressure immediately after engine restart.

Next, operation of the fifth embodiment is described. Referring to FIG. 17, immediately after engine restart subsequent to idle stop, due to no discharge pressure of the pump 22, the first switching valve 44' has spool valve 44' located in the right position by a load of the return spring 44g', so that the line pressure downstream of the manual valve 213 is supplied to the low clutch L/C through the bypass passage 45 with less passage resistance.

In this state, since the spool valve of the first shift valve 41 is located in the lower position, the output pressure of the lockup solenoid 520 is not led to the compartment 44j' of the first switching valve 44. Thus, it is preferable to hold a command to the lockup solenoid 520 turned off.

Figure 18:
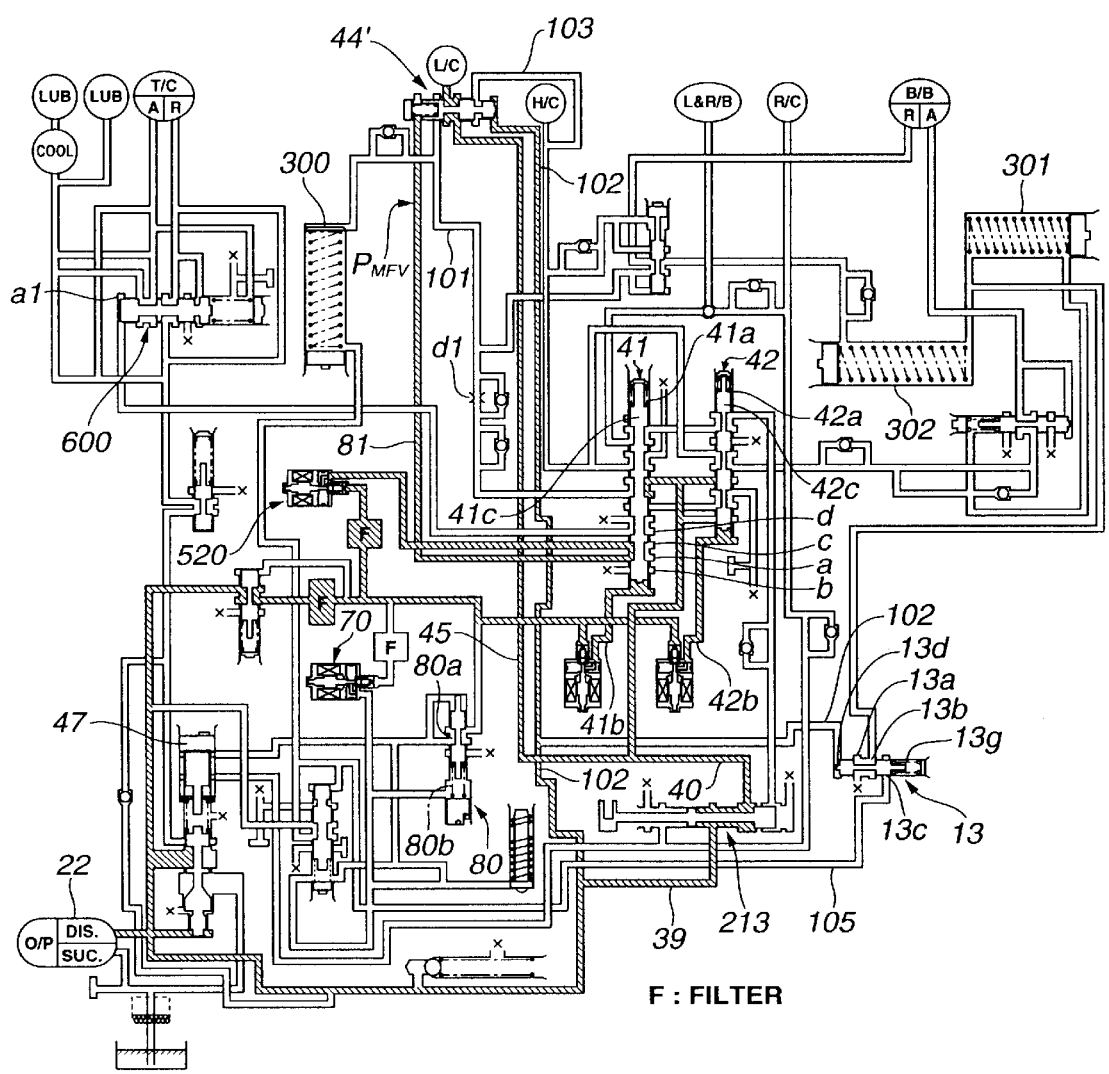
FIG. 18 is a diagram similar to FIG. 17, illustrating supply of the hydraulic pressure immediately after engine restart.

After the engine speed increases up to a point so as to surely move the spool valve of the first shift valve 41 to the upper position as shown in FIG. 18, a command to the lockup solenoid 520 is turned on. Then, since the output pressure of the lockup solenoid 520 is led to the compartment 44j' of the first switching valve 44', the spool valve 44f can surely be located in the upper position until the line pressure reaches a predetermined value. Thus, the line pressure downstream of the manual valve 213 is supplied to the low clutch L/C through the bypass passage 45 with less passage resistance.

With the timing when engagement of the low clutch L/C is completed apparently, the lockup solenoid 520 is turned off. At this point, due to the line pressure increased sufficiently, the compartment 44j' of the first switching valve 44' is drained.

Moreover, at this point, due to the line pressure increased sufficiently, the spool valve 44f of the first switching valve 44' is moved leftward against a load of the return spring 44g'. Then, the normal hydraulic circuit is formed which communicates with the low-clutch L/C and the passage 101 provided with the orifice d1 and the low-clutch accumulator chamber 300.

As described above, in the fifth embodiment, in accordance with the balance between the line pressure acting on the first pressure acting portion 44h' of the spool valve 44f of the first switching valve 44', the line pressure acting on the second pressure acting portion 44i' of the spool valve 44f, a load of the return spring 44g' acting on the second pressure acting portion 44i', and the output pressure of the lockup solenoid 520, it is determined whether the line pressure is supplied to the low clutch L/C through the bypass passage 45 with less passage resistance or the passage 101 provided with the orifice d1 and the low-clutch accumulator chamber 300.

Therefore, by setting a load of the return spring 44g' to surely locate the spool valve 44f in the upper position by the line pressure greater than the signal pressure which allows the first shift valve 41 to be located in the upper position, subsequent switching timing of the hydraulic passages can electrically be controlled by the output pressure of the lockup solenoid 520. Moreover, the availability factor of the lockup solenoid 520 can be enhanced.

In the fifth embodiment, control is carried out using the lockup solenoid 520 only, alternatively, it can be carried out using together the line-pressure duty solenoid 70 shown in the fourth embodiment.

Figure 19:
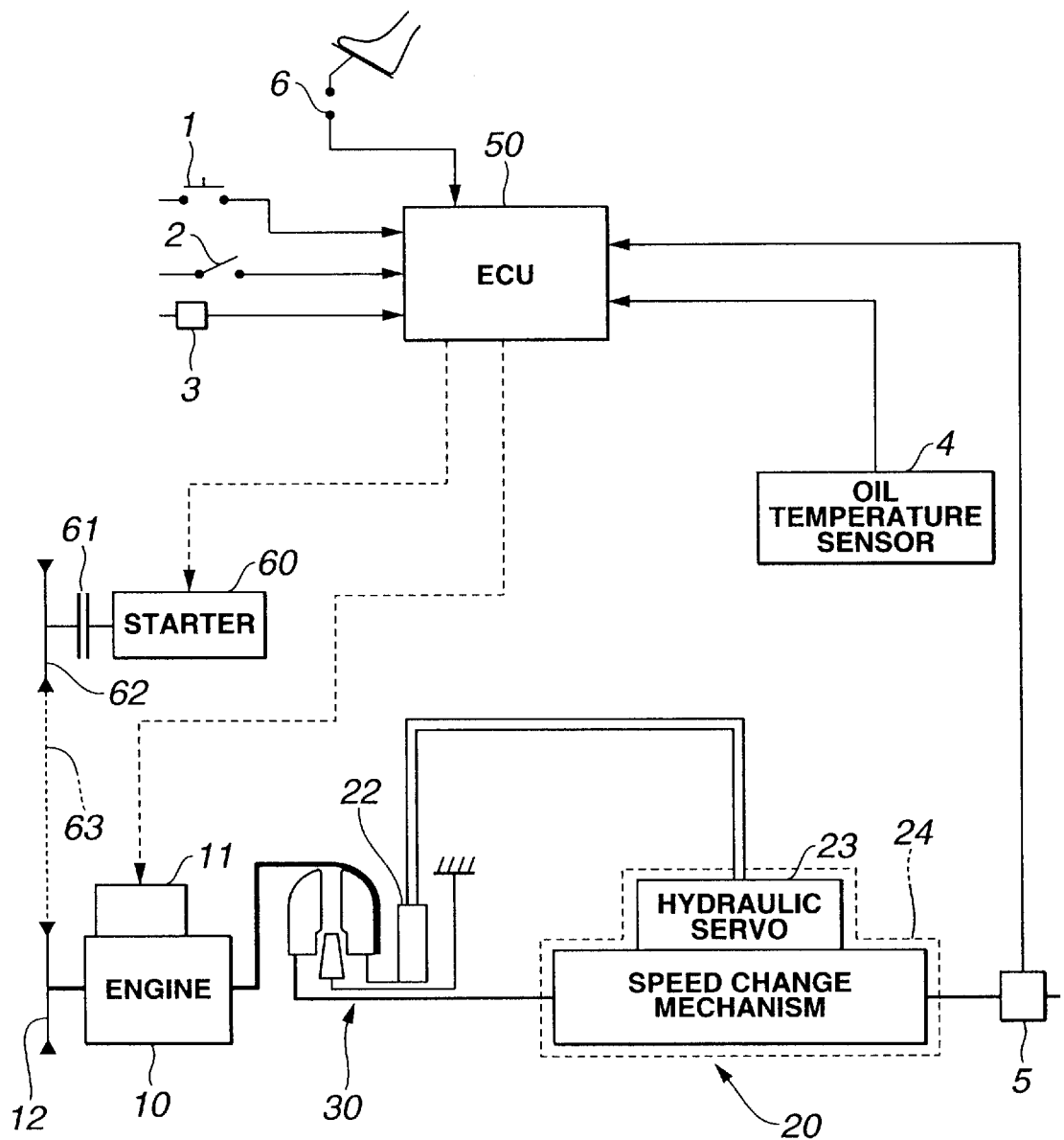
FIG. 19 is a block diagram similar to FIG. 1, showing a sixth embodiment of the present invention.

Referring to FIG. 19, there is shown the sixth embodiment of the present invention, which is substantially the same as the fifth embodiment except that it comprises an accelerator opening sensor 6 for sensing the opening of an accelerator pedal depressed by the driver.

Figure 20:
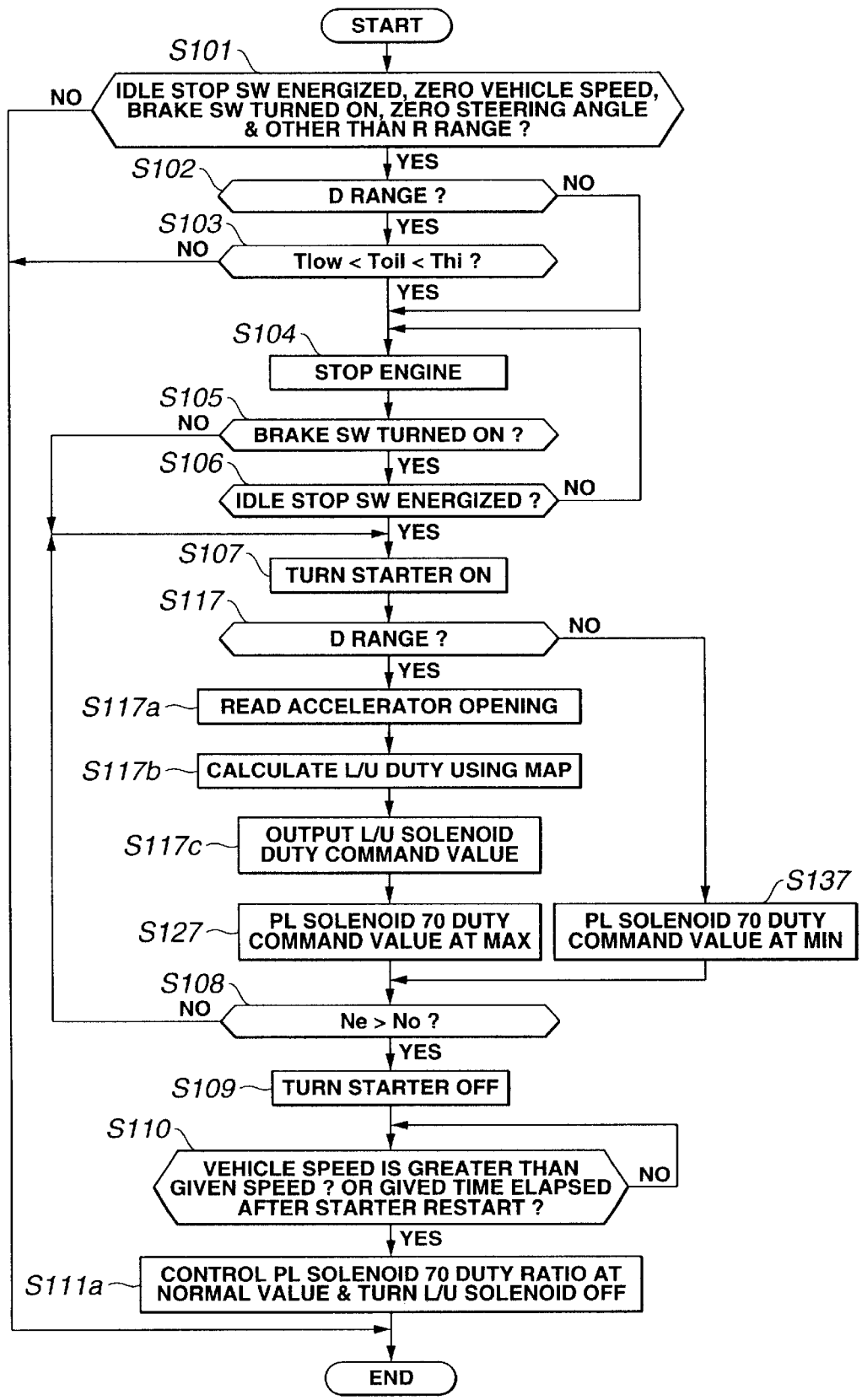
FIG. 20 is a chart similar to FIG. 13, illustrating operation of the sixth embodiment.

Referring to FIG. 20, the contents of idle-stop control in the sixth embodiment are described, which are substantially the same as those in the fourth embodiment. The following is a description about different steps only.

At a step S117a, an accelerator opening is read from the accelerator opening sensor 6.

Figure 21:
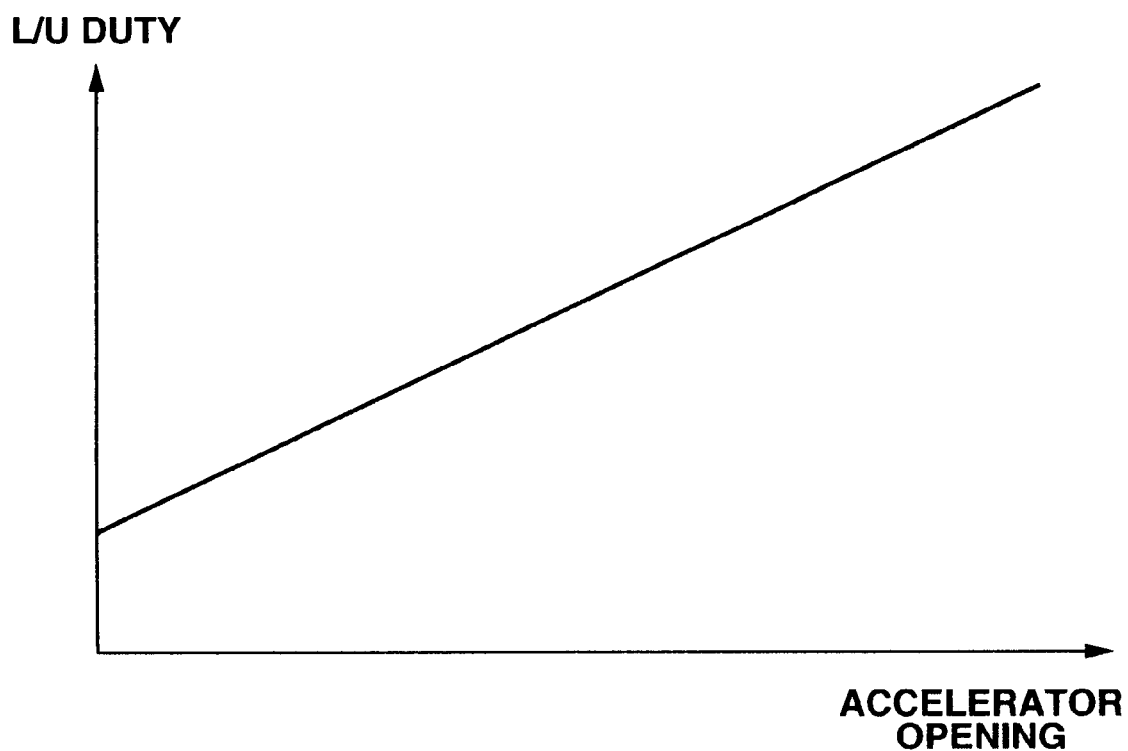
FIG. 21 is a map showing the relationship between the accelerator opening and the lockup duty ratio.

At a step S117b, the duty ratio of the lockup solenoid 520 is calculated using the map of accelerator opening vs. lockup duty ratio as shown in FIG. 21.

At a step S117c, a command value of the calculated duty ratio is output to the lockup solenoid 520.

At a step S111a, the duty ratio of the line-pressure duty solenoid 70 is set at a normal command value, and the lockup solenoid 520 is turned off.

Specifically, when the accelerator opening is larger, it means that the driver requires greater acceleration at vehicle start. Thus, an increase in engine speed after engine complete explosion becomes greater to provide greater torque to the low clutch L/C, so that until sufficient line pressure is secured, it is desirable to supply the hydraulic pressure to the low clutch L/C through the bypass passage 45 having higher oil charging speed. Therefore, an appropriate duty ratio of the lockup solenoid 520 corresponding to the accelerator opening is calculated using the map as shown in FIG. 21. The lockup duty ratio is increased to secure an engaging force capable of resisting great torque. And until the line pressure or opposite pressure becomes a value greater than the lockup duty ratio, i.e. a value capable of resisting input torque, the hydraulic pressure is directly supplied to the low clutch L/C through the bypass passage 45.

On the other hand, when the accelerator opening is smaller, it means that the driver requires smaller acceleration at vehicle start. Thus, smaller torque is provided to the low clutch L/C. At this time, the lockup duty ratio is reduced to achieve quick switching to the normal hydraulic circuit.

As described above, by controlling the lockup solenoid 520 in accordance with the accelerator opening, the hydraulic pressure can directly be supplied to the low clutch L/C through the bypass passage 45 until the line pressure or opposite pressure for switching the first switching valve 44' or low-clutch engagement pressure becomes a value capable of resisting input torque. Thus, even if the vehicle starts at full throttle immediately after engine restart subsequent to idle stop, the low clutch L/C has sufficient engaging force secured, thus allowing prevention of a start shock and the like due to lack of the engaging force.

Having described the present invention with regard to the illustrative embodiments, the present invention is not limited thereto, and various changes and modifications can be made without departing from the scope of the present invention. By way of example, the present invention is applicable to not only to the low clutch L/C, but to any other forward engagement elements of the automatic transmission. Moreover, in the illustrative embodiments, the invention is applied to the forward engagement elements of the gear-type multiple-speed automatic transmission. Alternatively, the invention can be applied to the forward engagement elements of a continuously variable transmission (CVT).

The entire teachings of Japanese Patent Application P2002-142167 filed May 16, 2002, Japanese Patent Application P2002-020990 filed Jan. 30, 2002, Japanese Patent Application P2001-341349 filed Nov. 7, 2001, and Japanese Patent Application P2001-167905 filed Jun. 4, 2001 are incorporated hereby by reference.

What is claimed is:

1. A hydraulic system for a vehicle with:
    an engine having idle-stop control, the idle-stop control controlling idle-start and idle-stop of the engine in accordance with preset idle-stop conditions; and
    an automatic transmission which carries out speed change using a hydraulic pressure supplied from a hydraulic-pressure source, the automatic transmission comprising a forward engagement element,
    the hydraulic system comprising:
        a control valve unit which controls the speed change of the automatic transmission, the control valve unit including a manual valve;
        a bypass passage which allows communication between a first hydraulic passage downstream of the manual valve and the forward engagement element;
        a first switching valve arranged on the bypass passage, the first switching valve being switched between a communicating state and a non-communicating state; and
        a first switching device which switches the first switching valve between the communicating state and the non-communicating state, the first switching device switching the first switching valve to the communicating state when the hydraulic pressure is lower than a predetermined pressure.

2. The hydraulic system as claimed in claim 1, wherein the first switching device controls the predetermined pressure to a higher value at engine restart after idle stop.

3. The hydraulic system as claimed in claim 2, wherein the predetermined pressure at engine restart after idle stop is higher as an accelerator opening is greater.

4. The hydraulic system as claimed in claim 1, wherein the first switching valve connects the forward engagement element to a second hydraulic passage downstream of the manual valve and the bypass passage, wherein the first switching device allows the first switching valve to be switched between the second hydraulic passage and the bypass passage in a underlapped way.

5. The hydraulic system as claimed in claim 1, wherein the first switching valve is connected to a third hydraulic passage for supplying the hydraulic pressure thereto, the first switching valve comprising a spool valve and a return spring for biasing the spool valve to a predetermined position, the spool valve comprising a first pressure acting portion on which the hydraulic pressure supplied through the third hydraulic passage acts to be opposite to a reaction force of the return spring.

6. The hydraulic system as claimed in claim 5, wherein the first switching device puts the bypass passage and the forward engagement element in communication by the reaction force of the return spring when the hydraulic pressure supplied through the third hydraulic passage is lower than the predetermined pressure, whereas the first switching device puts the bypass passage and the forward engagement element in non-communication and the second hydraulic passage and the forward engagement element in communication against the reaction force of the return spring when the hydraulic pressure supplied through the third hydraulic passage is equal to or higher than the predetermined pressure.

7. The hydraulic system as claimed in claim 5, wherein the first switching valve further comprises an assist mechanism for supplying the hydraulic pressure to bias the reaction force of the return spring, the spool valve further comprising a second pressure acting portion on which an output hydraulic pressure of the assist mechanism acts.

8. The hydraulic system as claimed in claim 7, wherein the first switching device puts the bypass passage and the forward engagement element in communication by the reaction force of the return spring and the output hydraulic pressure of the assist mechanism acting on the second pressure acting portion when the hydraulic pressure supplied through the third hydraulic passage is lower than the predetermined pressure, whereas the first switching device puts the bypass passage and the forward engagement element in non-communication and the second hydraulic passage and the forward engagement element in communication against the reaction force of the return spring and the output hydraulic pressure of the assist mechanism acting on the second pressure acting portion when the hydraulic pressure supplied through the third hydraulic passage is equal to or higher than the predetermined pressure.

9. The hydraulic system as claimed in claim 8, wherein the hydraulic pressure of the assist mechanism includes a pilot pressure output from a pilot valve.

10. The hydraulic system as claimed in claim 9, wherein the assist mechanism comprises a pressure modifying valve for adjusting the pilot pressure through a duty solenoid, wherein the output hydraulic pressure of the assist mechanism is adjusted by the pressure modifying valve and the duty solenoid.

11. The hydraulic system as claimed in claim 7, wherein the automatic transmission comprises a lockup clutch for directly coupling the engine and the automatic transmission, the hydraulic system further comprising a lockup solenoid and a lockup control valve which control engagement of the lockup clutch, the assist mechanism comprising the lockup solenoid, wherein the output hydraulic pressure of the assist mechanism serves as an output hydraulic pressure of the lockup solenoid.

12. The hydraulic system as claimed in claim 7, wherein the first switching device outputs to the assist mechanism a command for setting the output hydraulic pressure of the assist mechanism at a maximum value during a predetermined time period immediately after engine restart.

13. The hydraulic system as claimed in claim 1, further comprising an interlock preventing passage which supplies an engagement pressure of another forward engagement element at a speed ratio where interlock of the forward engagement element can occur, the interlock preventing passage communicating with the first switching valve.

14. The hydraulic system as claimed in claim 5, further comprising an interlock preventing passage which supplies an engagement pressure of another forward engagement element at a speed ratio where interlock of the forward engagement element can occur, the interlock preventing passage communicating with the first switching valve.

15. The hydraulic system as claimed in claim 14, wherein the spool valve further comprises a third pressure acting portion on which the engagement pressure supplied through the interlock preventing passage acts to be opposite to the reaction force of the return spring, wherein the first switching device puts the bypass passage and the forward engagement element in non-communication and the first hydraulic passage and the forward engagement element in communication against the reaction force of the return spring when the engagement pressure is supplied through the interlock preventing passage.

16. The hydraulic system as claimed in claim 13, further comprising a second switching valve arranged on the bypass passage between the manual valve and the first switching valve, the second switching valve being switched between a communicating state and a non-communicating state; and a second switching device which switches the second switching valve between the communicating state and the non-communicating state, the second switching device putting the manual valve and the first switching valve in non-communication when the engagement pressure of the another forward engagement element is higher than a predetermined value.

17. The hydraulic system as claimed in claim 1, further comprising a third switching valve arranged on a fourth hydraulic passage for supplying the hydraulic pressure to an accumulator used at a speed ratio obtained by engagement of other engagement elements than the forward engagement element, the third switching valve being switched between a communicating state and a non-communicating state; a third switching device which switches the third switching valve between the communicating state and the non-communicating state, the third switching device switching the third switching valve to the non-communicating state when the hydraulic pressure is lower than the predetermined pressure.

18. A hydraulic system for a vehicle with:
an engine having idle-stop control, the idle-stop control controlling idle-start and idle-stop of the engine in accordance with preset idle-stop conditions; and
an automatic transmission which carries out speed change using a hydraulic pressure supplied from a hydraulic-pressure source, the automatic transmission comprising a forward engagement element, the hydraulic system comprising:
a control valve unit which controls the speed change of the automatic transmission, the control valve unit including a manual valve;
a bypass passage which allows communication between a first hydraulic passage downstream of the manual valve and the forward engagement element;
a first switching valve arranged on the bypass passage, the first switching valve being switched between a communicating state and a non-communicating state; and
first switching means for switching the first switching valve between the communicating state and the non-communicating state, the first switching means switching the first switching valve to the communicating state when the hydraulic pressure is lower than a predetermined pressure.

19. A vehicle, comprising:
an engine having idle-stop control, the idle-stop control controlling idle-start and idle-stop of the engine in accordance with preset idle-stop conditions;
an automatic transmission which carries out speed change using a hydraulic pressure supplied from a hydraulic-pressure source, the automatic transmission comprising a forward engagement element; and
a hydraulic system comprising:
a control valve unit which controls the speed change of the automatic transmission, the control valve unit including a manual valve;
a bypass passage which allows communication between a first hydraulic passage downstream of the manual valve and the forward engagement element;
a first switching valve arranged on the bypass passage, the first switching valve being switched between a communicating state and a non-communicating state; and
a first switching device which switches the first switching valve between the communicating state and the non-communicating state, the first switching device switching the first switching valve to the communicating state when the hydraulic pressure is lower than a predetermined pressure.

* * * * *